(12) United States Patent
Gottlieb et al.

(10) Patent No.: US 11,392,421 B1
(45) Date of Patent: Jul. 19, 2022

(54) APPARATUSES, COMPUTER-IMPLEMENTED METHODS, AND SYSTEMS FOR OUTPUTTING A NORMALIZING RESOURCE ESTIMATE AGGREGATION INTERFACE COMPONENT IN ASSOCIATION WITH A PROJECT MANAGEMENT SYSTEM

(71) Applicants: ATLASSIAN PTY LTD., Sydney (AU); ATLASSIAN, INC., San Francisco, CA (US)

(72) Inventors: Caroline Gottlieb, Austin, TX (US); Shaunak Patel, Austin, TX (US); Nathaniel Benton Jones, Atlanta, GA (US)

(73) Assignees: Atlassian PTY Ltd., Sydney (AU); Atlassian, Inc., San Francisco, CA (US)

( * ) Notice: Subject to any disclaimer, the term of this patent is extended or adjusted under 35 U.S.C. 154(b) by 0 days.

(21) Appl. No.: 17/457,219

(22) Filed: Dec. 1, 2021

(51) Int. Cl.
*G06F 9/46* (2006.01)
*G06F 9/50* (2006.01)
*G06N 20/00* (2019.01)

(52) U.S. Cl.
CPC ............ *G06F 9/5072* (2013.01); *G06F 9/505* (2013.01); *G06N 20/00* (2019.01)

(58) Field of Classification Search
CPC ........ G06F 9/5072; G06F 9/505; G06N 20/00
See application file for complete search history.

(56) References Cited

U.S. PATENT DOCUMENTS

| 2002/0078432 A1* | 6/2002 | Charisius | G06Q 10/06 717/102 |
| 2009/0125359 A1* | 5/2009 | Knapic | G06Q 10/06 709/204 |
| 2011/0060623 A1* | 3/2011 | Neureuter | G06F 3/0486 715/769 |
| 2020/0226518 A1* | 7/2020 | Li | G06Q 10/06311 |

* cited by examiner

Primary Examiner — Wissam Rashid
(74) Attorney, Agent, or Firm — Alston & Bird LLP

(57) ABSTRACT

Methods, apparatuses, systems, and computer program products are disclosed for outputting a normalizing resource estimate aggregation interface component in a project management system. In an example embodiment, an apparatus detects a normalizing resource estimate aggregation interface component request, accesses resource data, determines a current normalized program resource per estimation unit based at least in part on the resource data, determines a predicted resource value, an expected resource value, and an accepted resource value for one or more principal development unit objects, generates a normalizing resource estimate aggregation interface component including a summary presentation including the predicted resource value, the expected resource value, and the accepted resource value for a corresponding principal development unit object, and outputs the normalizing resource estimate aggregation interface component for rendering to a project management user interface.

26 Claims, 11 Drawing Sheets

NORMALIZING RESOURCE ESTIMATE AGGREGATION INTERFACE COMPONENT

🔍 SEARCH BY ID, NAME, OR TAG | ALL THEMES ▸ | ◐ SHOE STAND-ALONE FEATURES

| | Id | | TITLE | OWNER | BUDGET | PREDICTED RESOURCE VALUE | EXPECTED RESOURCE VALUE (BY FUNCTIONALITY) | ACCEPTED RESOURCE VALUE (BY FUNCTIONALITY) |
|---|---|---|---|---|---|---|---|---|
| ● ∨ | 4338 | ▦ | EPIC ALPHA | ☐ | $800,000 | $357,050 | $229,995 | $41,575 |
| ● ∨ | 4438 | ▦ | EPIC BETA | ☐ | $0 | $0 — 302 | $0 | $0 — 304 |
| ● ∨ | 4450 | ▦ | EPIC GAMMA | ☐ | $0 | $219,100 | $278,999 — 303 | $0 |
| ● ∨ | 4371 | ▦ | EPIC DELTA | ☐ | $0 | $4,100 | $17,122 | $1,997 |

EXPECTED RESOURE VALUE
EXPECTED RESOURE VALUE IS CALCULATED BY ADDING TOGETHER ALL THE ESTIMATED FUNCTIONALITIES RELEASED TO THIS PAGE $975,000

| TOTAL | ESTIMATED | RESOURCES EXPECTED |
|---|---|---|
| 48 FUNCTIONALITIES | 38 FUNCTIONALITIES | 10 FUNCTIONALITIES |

$250,000

○ 10 FUNTIONALITIES ARE NOT ESTIMATED
ANY FUNCTIONALITIES NOT ESTIMATED IS NOT REPRESENTED IN THE GROUP ABOVE. TO FURTHER DEFINE THIS CALCULATION, THE SPENDER OR FUNTIONALITY SPENDER SHOULD ESTIMATE THE WORK IN THE DETAILS TAB ON THE FUNCTIONALITY PANEL.

ESTIMATED FUNCTIONALITIES

| EPIC GAMMA | FUNTIONALITIES WITH ESTIMATIONS IN EPIC GAMMA | ESTIMATED SAVED FOR EPIC GAMMA |
|---|---|---|
| 1234 FUNCTIONALITY A | IN PROGRESS | $14,480 |
| 1234 FUNCTIONALITY B | IN PROGRESS | $14,480 |
| 1234 FUNCTIONALITY C | IN PROGRESS | $14,480 |
| 1234 FUNCTIONALITY D | IN PROGRESS | $14,480 |
| 1234 FUNCTIONALITY E | IN PROGRESS | $14,480 |
| 1234 FUNCTIONALITY F | IN PROGRESS | $14,480 |
| 1234 FUNCTIONALITY G | IN PROGRESS | $14,480 |
| 1234 FUNCTIONALITY H | IN PROGRESS | $14,480 |

FIG. 3C

APPARATUSES, COMPUTER-IMPLEMENTED METHODS, AND SYSTEMS FOR OUTPUTTING A NORMALIZING RESOURCE ESTIMATE AGGREGATION INTERFACE COMPONENT IN ASSOCIATION WITH A PROJECT MANAGEMENT SYSTEM

BACKGROUND

Various methods, apparatuses, and systems provide tools allowing users to coordinate, plan, track, manage and/or otherwise monitor the development of projects in project management systems. Applicant has identified a number of deficiencies and problems in existing project management systems associated with efficiently providing and reliably predicting and/or estimating allocations of resources, investments, and commitments across a plurality of projects, such as when scaling such features to the enterprise level of an organization, as such projects are based on a variety of underlying dissimilar assumptions, considerations, and data sets. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved methods, apparatuses, systems, and computer program products configured for generating and outputting a normalizing resource estimate aggregation interface component, in real time or near real time, in association with a project management system. In accordance with one exemplary embodiment of the present disclosure, an apparatus is provided for outputting a normalizing resource estimate aggregation interface component in a project management system, the apparatus including at least one processor, and at least one non-transitory memory including program code, the at least one non-transitory memory and the program code configured to, with the at least one processor, cause the apparatus to detect a normalizing resource estimate aggregation interface component request in response to user interaction with a project management user interface, wherein the normalizing resource estimate aggregation interface component request is associated with a selected portfolio identifier and a user identifier, and wherein the selected portfolio identifier is associated with one or more principal development unit objects. In some embodiments, the program code is configured to cause the apparatus to access resource data associated with each of the one or more principal development unit objects, wherein each principal development unit object comprises one or more program development units, and for each program development unit, determine, via the at least one processor, a current normalized program resource per estimation unit based at least in part on the resource data. In certain embodiments, the program code is configured to cause the apparatus determine, via the at least one processor, a predicted resource value, an expected resource value, and an accepted resource value for each principal development unit object and generate a normalizing resource estimate aggregation interface component, wherein the normalizing resource estimate aggregation interface component comprises a summary presentation of at least one of the principal development unit objects, and wherein each summary presentation comprises the predicted resource value, the expected resource value, and the accepted resource value for the corresponding principal development unit object. In still further embodiments, the program code is configured to cause the apparatus to output the normalizing resource estimate aggregation interface component for rendering to the project management user interface associated with the user identifier.

In certain embodiments, each of the one or more program development units includes one or more active team units, wherein each active team is associated with a plurality of subsidiary development units, and wherein each active team unit is associated with a differing relative estimation unit valuation scale.

In some embodiments, determining the current normalized program resource per estimation unit includes identifying a set of subsidiary development units from the plurality of subsidiary development units, identifying a non-normalized accepted estimation unit value for each active team unit based on the relative estimation unit valuation scale associated with the corresponding active team unit for each subsidiary development unit of the set of subsidiary development units, generating a normalized accepted estimation unit value based on a normalization of the non-normalized accepted estimation unit value to a common estimation unit valuation scale, determining a normalized team resource per estimation unit for each active team unit for each subsidiary development unit of the set of subsidiary development units based on the normalized accepted estimation unit values and calculating the current normalized program resource per estimation unit by averaging an aggregation of the averaged incremental normalized program resource per estimation units associated with the set of subsidiary development units.

In some embodiments, generating the normalized accepted estimation unit value based on the normalization of the non-normalized accepted estimation unit value to the common estimation unit valuation scale is based at least on a universal estimation system conversion variable. In some further embodiments, the universal estimation system conversion variable is based on a machine learning model. In still further embodiments, the machine learning model is trained using historical resource data.

In some embodiments, the set of subsidiary development units is the most recent n subsidiary development units associated with the active team such that the current normalized program resource per estimation unit is a rolling average.

In some embodiments, each of the one or more program development units includes one or more planning increments and determining the predicted resource value for a selected principal development unit object includes determining whether any of the planning increments of the selected program development unit are completed, accessing a baselined planning increment predicted resource value for each completed planning increment, determining a current planning increment predicted resource value for each planning increment that is not completed, and aggregating the baselined and current planning increment predicted resource values. In some further embodiments, the current planning increment predicted resource value of a planning increment that is not completed is based on a current planning increment estimation unit prediction and the current normalized program resource per estimation unit. In other embodiments, the current planning increment predicted resource value of a planning increment that is not completed is based on a current planning increment estimation unit prediction and the current normalized program resource per estimation unit.

In some embodiments, the baselined planning increment predicted resource value of a completed planning increment is based on a baselined planning increment estimation unit prediction and a baselined normalized program resource per estimation unit. In certain embodiments, the baselined normalized program resource per estimation unit is the current normalized program resource per estimate unit coinciding with the completion of the corresponding planning increment and stored in association with the completed planning increment. In other embodiments, the baselined planning increment estimation unit prediction is the current planning increment estimation unit prediction coinciding with the completion of the corresponding planning increment and stored in association with the completed planning increment.

In some embodiments, at least one of the program development units comprises one or more functionality development units. In some further embodiments, determining the expected resource value for a selected principal development unit object includes determining whether any of the functionality development units of the selected principal development unit are associated with an accepted status, accessing a baselined functionality resource estimation value for each accepted functionality development unit, determining a current functionality resource estimation value for each functionality development unit that is not associated with an accepted status, and aggregating the baselined and current functionality resource estimation values of the selected principal development unit object.

In some embodiments, the selected functionality development unit is assigned a primary program development unit and the associated functionality resource estimation value is based on resource data associated with the primary program development unit in an instance wherein a selected functionality development unit is associated with two or more program development units.

In some embodiments, the current functionality resource estimation value of a selected functionality development unit that is not associated with an accepted status is based on a current functionality estimation unit prediction and the current normalized program resource per estimation unit for the program development unit comprising the selected functionality development unit. In certain embodiments, the baselined functionality resource estimation value of an accepted functionality development unit is based on a baselined functionality estimation unit prediction and a baselined normalized program resource per estimation unit for the program development unit comprising the accepted functionality development unit. In some embodiments, the baselined normalized program resource per estimation unit is the current normalized program resource per estimate unit coinciding with the acceptance of the accepted functionality development unit and stored in association with the accepted functionality development unit. In certain embodiments, the baselined functionality estimation unit prediction is the current functionality estimation unit prediction coinciding with the acceptance of the accepted functionality development unit and stored in association with the accepted functionality development unit.

In some embodiments, each principal development unit object comprises one or more story development units. In some further embodiments, determining the accepted resource value for a selected principal development unit object includes identifying one or more story development units of the selected principal development unit object associated with an accepted status, for each of the one or more story development units of the selected principal development unit object associated with an accepted status, determining an accepted story resource value, and aggregating the accepted story resource values of the selected principal development unit object. In certain further embodiments, determining the accepted story resource value of a story development unit associated with an accepted status includes identifying a sprint identifier for each accepted story development unit, determining a current normalized team resource per estimation unit for each accepted story development unit based at least in part on the resource data associated with each respective sprint identifier, determining a current work effort value associated with the story development unit, and generating the accepted story resource value for each accepted story development unit based on an analysis of the associated current work effort value and current normalized team resource per estimation unit.

In some embodiments, the program code is further configured to cause the apparatus to detect a display detailed normalizing resource estimate interface component request in response to user interaction with the normalizing resource estimate aggregation interface component, wherein the display expanded resource estimate interface component request is associated with a resource value identifier corresponding to one of the predicted resource value, the expected resource value, and the accepted resource value, generate a detailed normalizing resource estimate aggregation interface component based on the associated resource value identifier, wherein the detailed resource estimate interface component comprises a listing of the one or more development units associated with the selected resource identifier, and output the detailed resource estimate interface component for rendering to the project management interface associated with the user identifier.

In some embodiments, the program code is further configured to cause the apparatus to detect a snapshot resource allocation interface component request, wherein the snapshot resource allocation interface component request is associated with the selected portfolio identifier generate a snapshot resource allocation interface component, wherein the snapshot allocation interface component comprises one or more visual emphasis elements comprising one or more visual consumption depictions, and output the snapshot resource allocation interface component to the project management user interface.

In accordance with another exemplary embodiment of the present disclosure, a computer-implemented method includes detecting a normalizing resource estimate aggregation interface component request in response to user interaction with a project management user interface, wherein the normalizing resource estimate aggregation interface component request is associated with a selected portfolio identifier and a user identifier, and wherein the selected portfolio identifier is associated with one or more principal development unit objects, accessing resource data associated with each of the one or more principal development unit objects, wherein each principal development unit object comprises one or more program development units, for each program development unit, determining a current normalized program resource per estimation unit based at least in part on the resource data, determining a predicted resource value, an expected resource value, and an accepted resource value for each principal development unit object, generating a normalizing resource estimate aggregation interface component, wherein the normalizing resource estimate aggregation interface component comprises a summary presentation of at least one of the principal development unit objects, and wherein each summary presentation comprises the predicted resource value, the expected resource value, and the accepted resource value for the corresponding principal development unit object, and outputting the normalizing resource estimate aggregation interface component for rendering to the project management user interface associated with the user identifier.

In some embodiments, each of the one or more program development units includes one or more active team units, wherein each active team is associated with a plurality of subsidiary development units, and wherein each active team unit is associated with a differing relative estimation unit valuation scale.

In some embodiments, determining the current normalized program resource per estimation unit includes identifying a set of subsidiary development units from the plurality of subsidiary development units, for each subsidiary development unit of the set of subsidiary development units, identifying a non-normalized accepted estimation unit value for each active team unit based on the relative estimation unit valuation scale associated with the corresponding active team unit, for each subsidiary development unit of the set of subsidiary development units generating a normalized accepted estimation unit value based on a normalization of the non-normalized accepted estimation unit value to a common estimation unit valuation scale, based on the normalized accepted estimation unit values, determining a normalized team resource per estimation unit for each active team unit for each subsidiary development unit of the set of subsidiary development units, for each subsidiary development unit of the set of subsidiary development units, generating an averaged incremental normalized program resource per estimation unit by averaging the normalized team resource per estimation unit values associated with the active team units and calculating the current normalized program resource per estimation unit by averaging an aggregation of the averaged incremental normalized program resource per estimation units associated with the set of subsidiary development units.

In some embodiments, generating the normalized accepted estimation unit value based on the normalization of the non-normalized accepted estimation unit value to the common estimation unit valuation scale is based at least on a universal estimation system conversion variable. In certain embodiments, the universal estimation system conversion variable is based on a machine learning model. In still further embodiments, the machine learning model is trained using historical resource data.

In some embodiments, the set of subsidiary development units is the most recent n subsidiary development units associated with the active team such that the current normalized program resource per estimation unit is a rolling average.

In some embodiments, each of the one or more program development units comprises one or more planning increments and wherein determining the predicted resource value for a selected principal development unit object includes determining whether any of the planning increments of the selected program development unit are completed, for each completed planning increment, accessing a baselined planning increment predicted resource value, for each planning increment that is not completed, determining a current planning increment predicted resource value, and aggregating the baselined and current planning increment predicted resource values.

In some embodiments, the current planning increment predicted resource value of a planning increment that is not completed is based on a current planning increment estimation unit prediction and the current normalized program resource per estimation unit.

In some embodiments, the baselined planning increment predicted resource value of a completed planning increment is based on a baselined planning increment estimation unit prediction and a baselined normalized program resource per estimation unit. In certain embodiments, the baselined normalized program resource per estimation unit is the current normalized program resource per estimate unit coinciding with the completion of the corresponding planning increment and stored in association with the completed planning increment. In still further embodiments, the baselined planning increment estimation unit prediction is the current planning increment estimation unit prediction coinciding with the completion of the corresponding planning increment and stored in association with the completed planning increment.

In some embodiments, at least one of the program development units comprises one or more functionality development units. In certain embodiments, determining the expected resource value for a selected principal development unit object includes determining whether any of the functionality development units of the selected principal development unit are associated with an accepted status, for each accepted functionality development unit, accessing a baselined functionality resource estimation value, for each functionality development unit that is not associated with an accepted status, determining a current functionality resource estimation value, and aggregating the baselined and current functionality resource estimation values of the selected principal development unit object.

In some embodiments, in an instance wherein a selected functionality development unit is associated with two or more program development units, the computer-implemented method includes assigning the selected functionality development unit to a primary program development unit such that the associated functionality resource estimation value is based on resource data associated with the primary program development unit.

In some embodiments, the current functionality resource estimation value of a selected functionality development unit that is not associated with an accepted status is based on a current functionality estimation unit prediction and the current normalized program resource per estimation unit for the program development unit comprising the selected functionality development unit. In certain embodiments, the baselined functionality resource estimation value of an accepted functionality development unit is based on a baselined functionality estimation unit prediction and a baselined normalized program resource per estimation unit for the program development unit comprising the accepted functionality development unit. In some further embodiments, the baselined normalized program resource per estimation unit is the current normalized program resource per estimate unit coinciding with the acceptance of the accepted functionality development unit and stored in association with the accepted functionality development unit.

In some embodiments, the baselined functionality estimation unit prediction is the current functionality estimation unit prediction coinciding with the acceptance of the accepted functionality development unit and stored in association with the accepted functionality development unit.

In some embodiments, each principal development unit object comprises one or more story development units. In some further embodiments, determining the accepted resource value for a selected principal development unit object includes identifying one or more story development units of the selected principal development unit object associated with an accepted status, for each of the one or more story development units of the selected principal development unit object associated with an accepted status, determining an accepted story resource value, and aggregating the accepted story resource values of the selected principal development unit object.

In some embodiments, determining the accepted story resource value of a story development unit associated with an accepted status includes identifying a sprint identifier for each accepted story development unit, determining a current normalized team resource per estimation unit for each accepted story development unit based at least in part on the resource data associated with each respective sprint identifier, determining a current work effort value associated with the story development unit, and generating the accepted story resource value for each accepted story development unit based on an analysis of the associated current work effort value and current normalized team resource per estimation unit.

In accordance with another exemplary embodiment of the present disclosure, one or more non-transitory computer-readable media storing computer-executable instructions that, when executed by one or more processors, are configured to cause detecting a normalizing resource estimate aggregation interface component request in response to user interaction with a project management user interface, wherein the normalizing resource estimate aggregation interface component request is associated with a selected portfolio identifier and a user identifier, and wherein the selected portfolio identifier is associated with one or more principal development unit objects, accessing resource data associated with each of the one or more principal development unit objects, wherein each principal development unit object comprises one or more program development units, for each program development unit, determining a current normalized program resource per estimation unit based at least in part on the resource data, determining a predicted resource value, an expected resource value, and an accepted resource value for each principal development unit object, generating a normalizing resource estimate aggregation interface component, wherein the normalizing resource estimate aggregation interface component comprises a summary presentation of at least one of the principal development unit objects, and wherein each summary presentation comprises the predicted resource value, the expected resource value, and the accepted resource value for the corresponding principal development unit object; and outputting the normalizing resource estimate aggregation interface component for rendering to the project management user interface associated with the user identifier.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1:
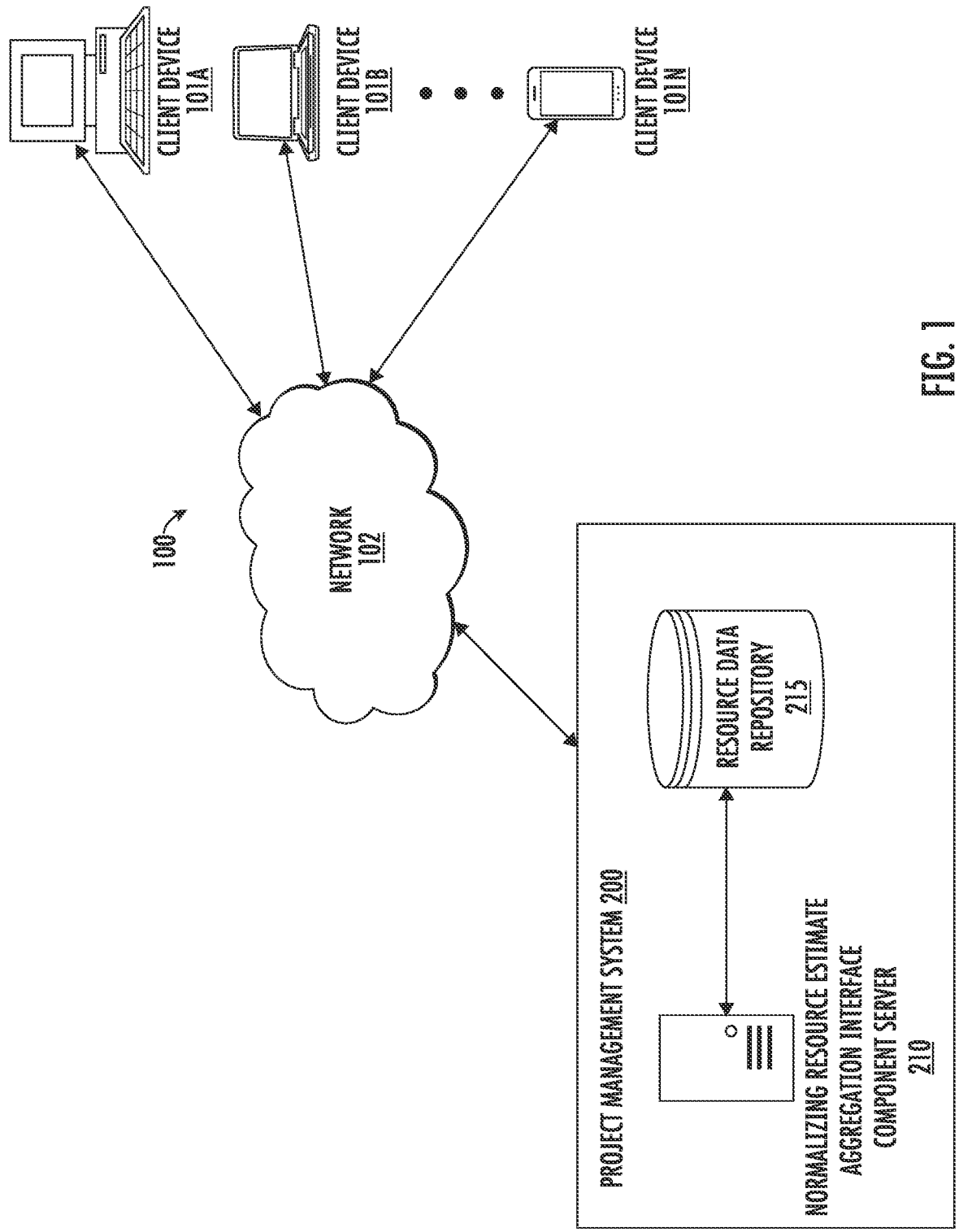
Figure 2:
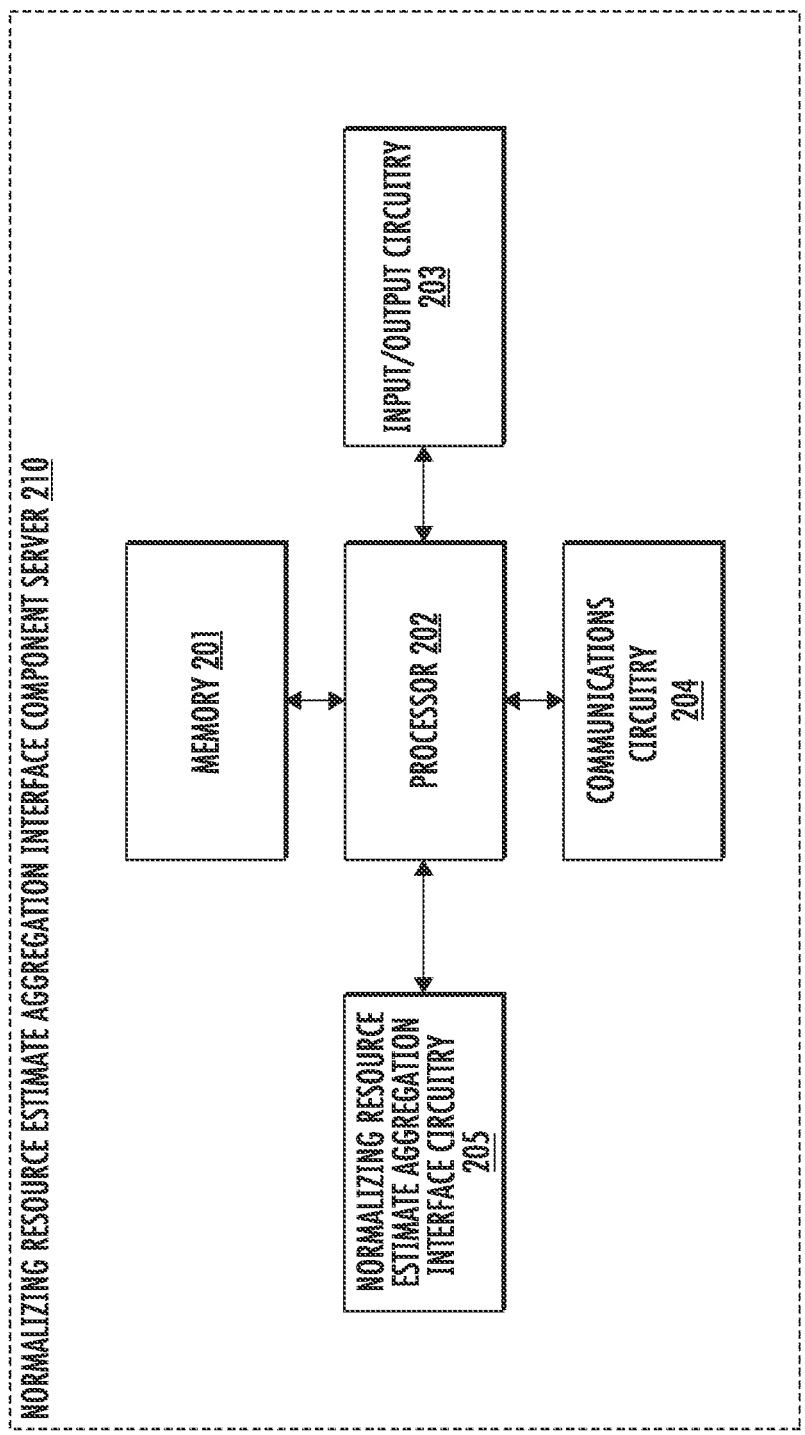
Figure 3A:
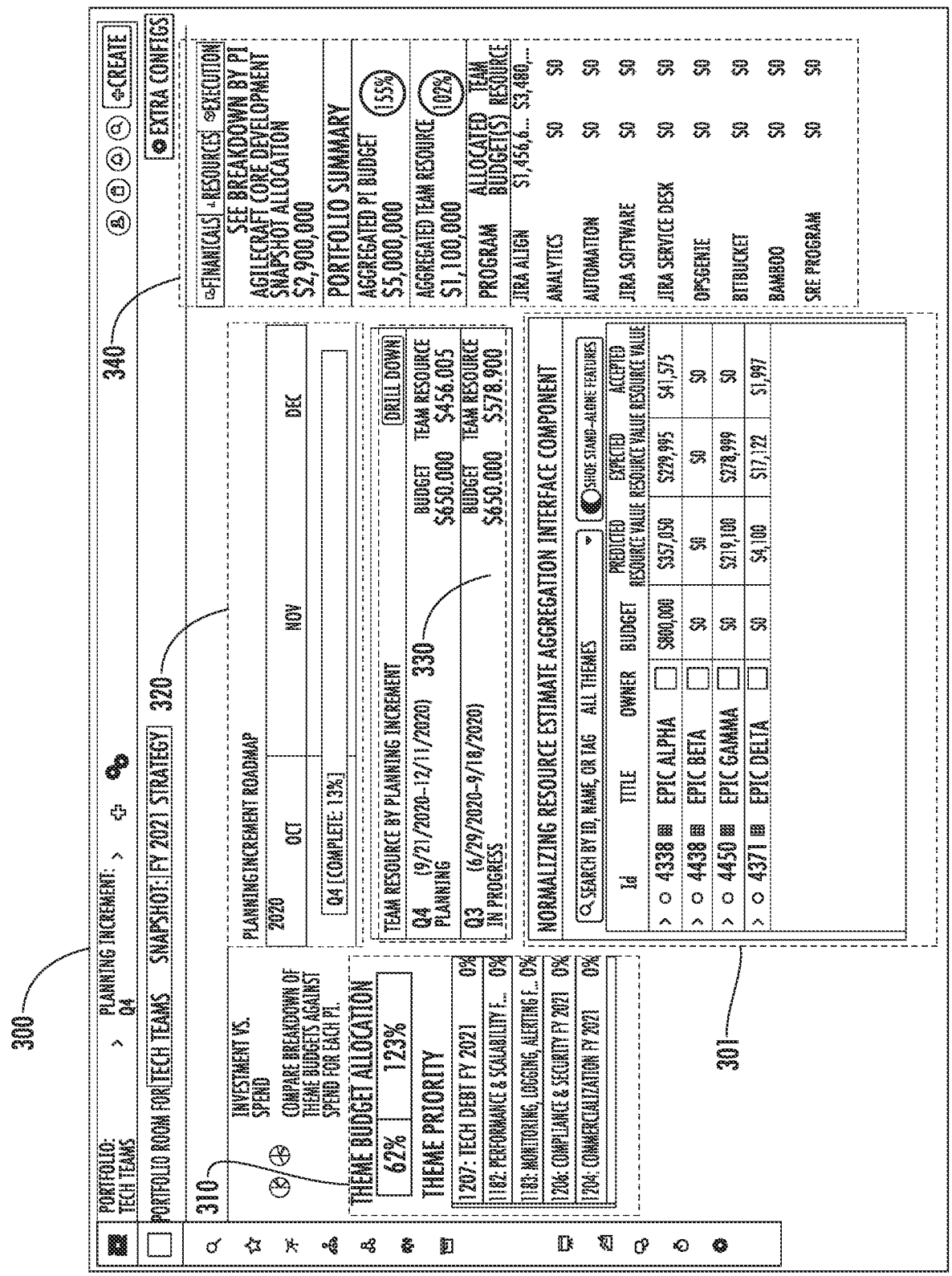
Figure 4A:
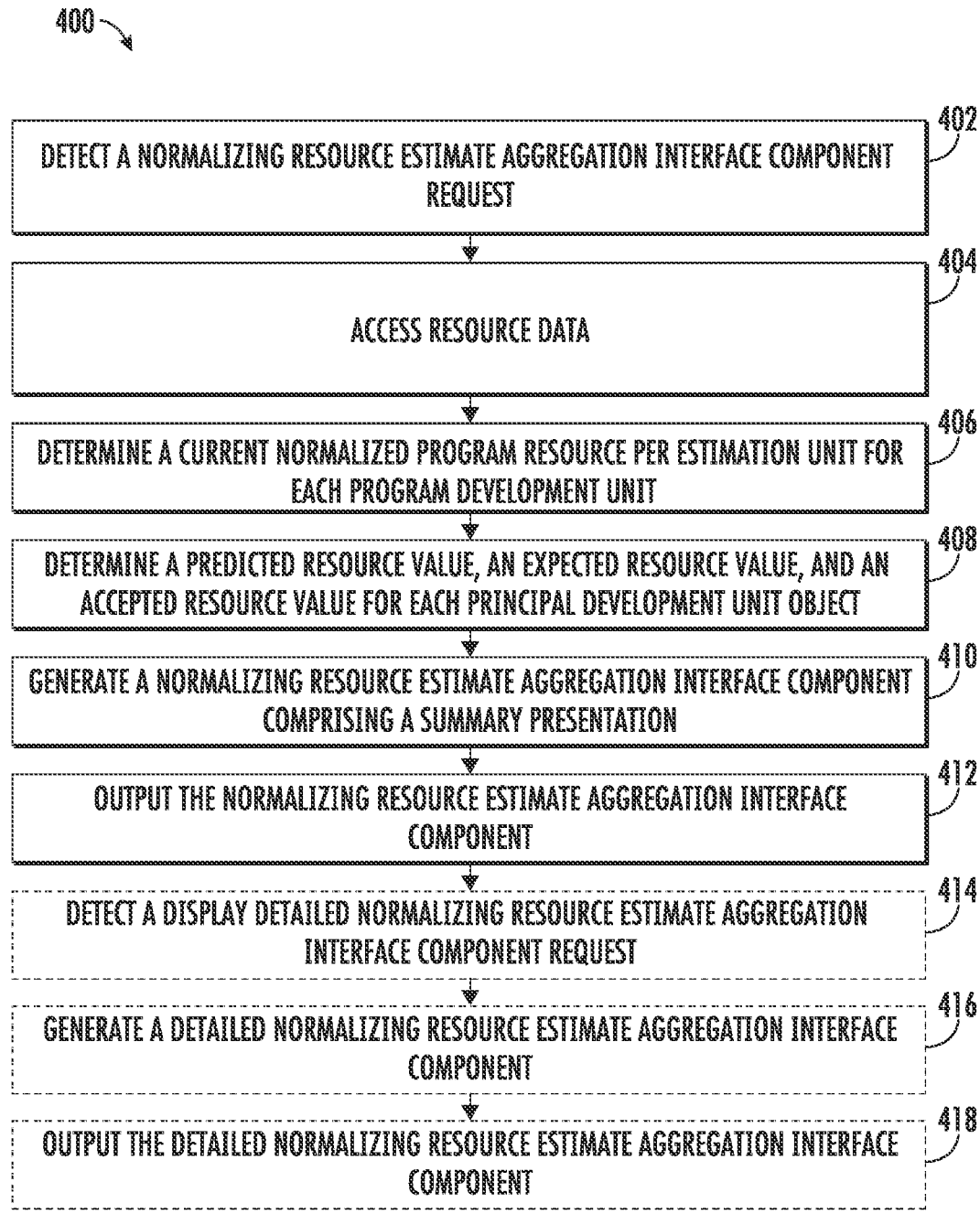
Figure 4B:
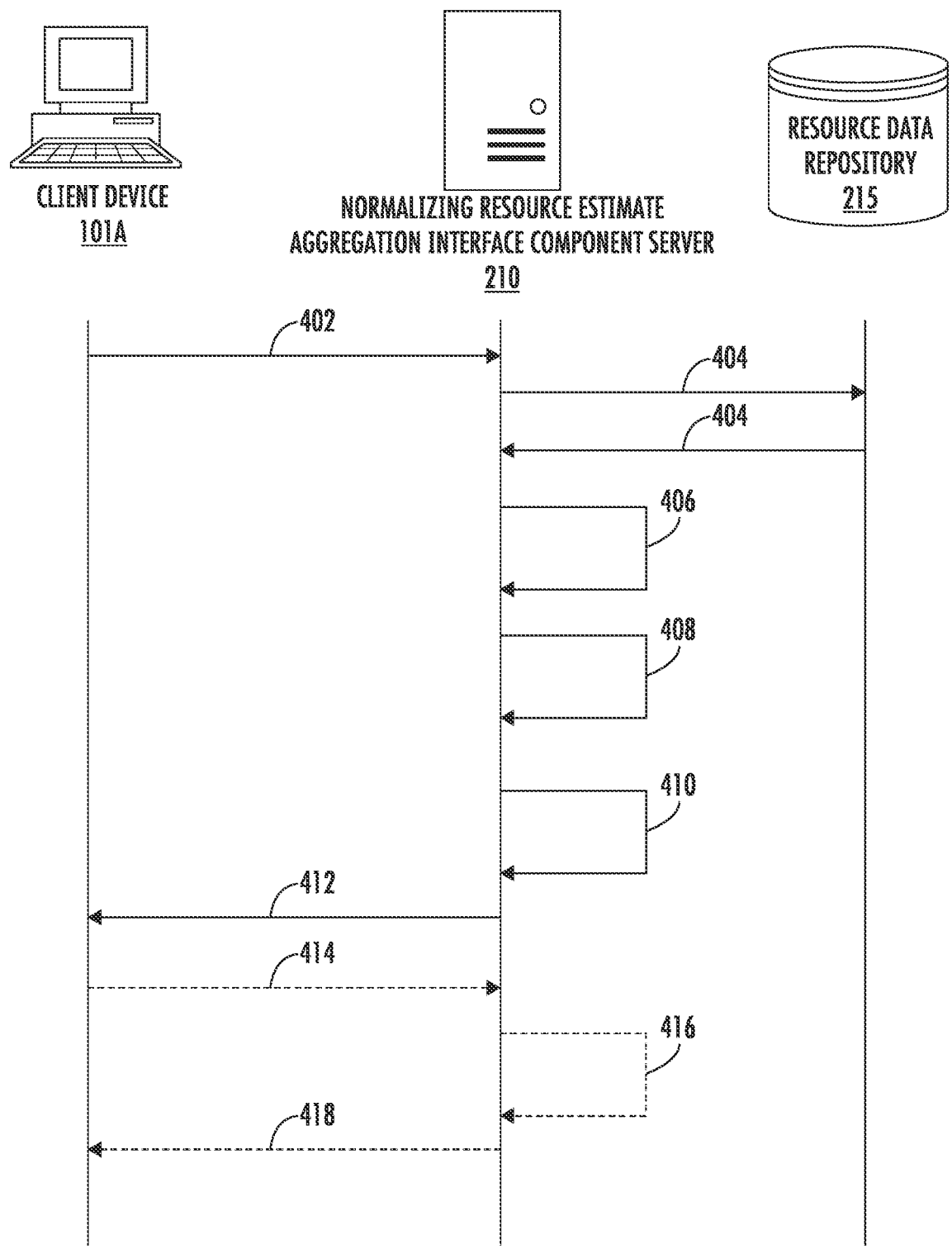
Figure 5:
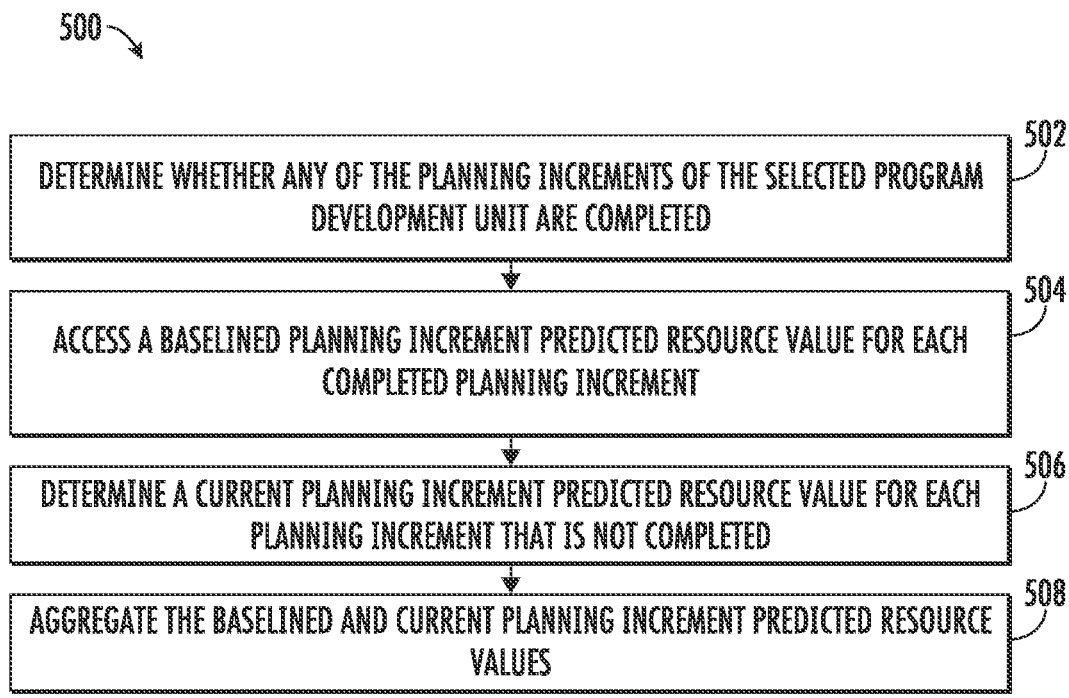
Figure 6:
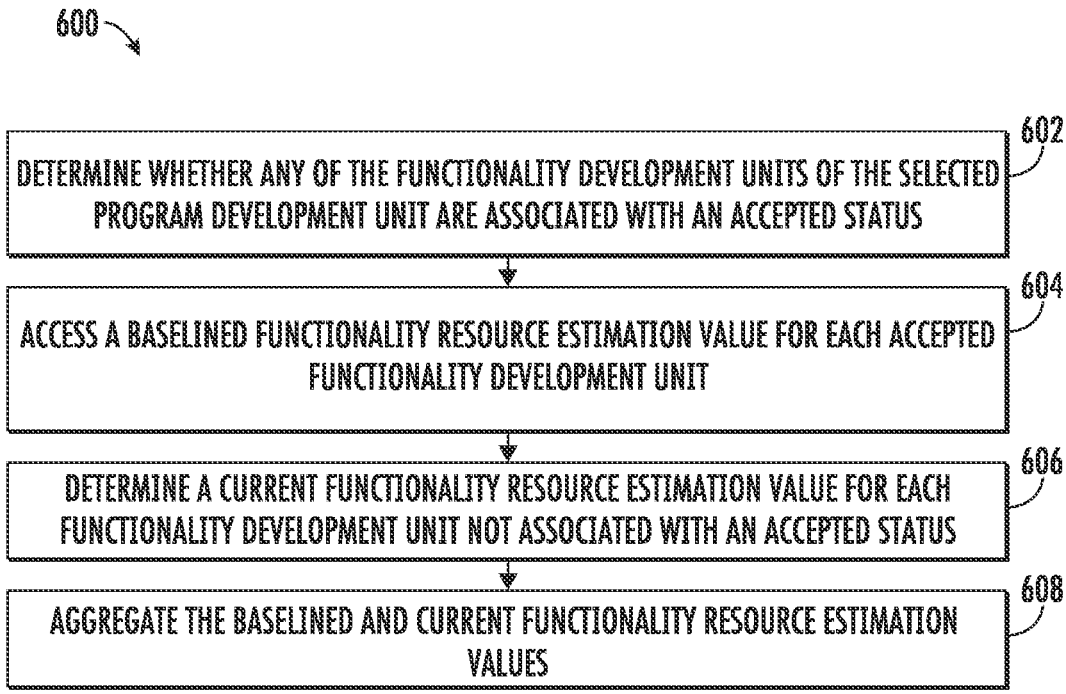
Figure 7:
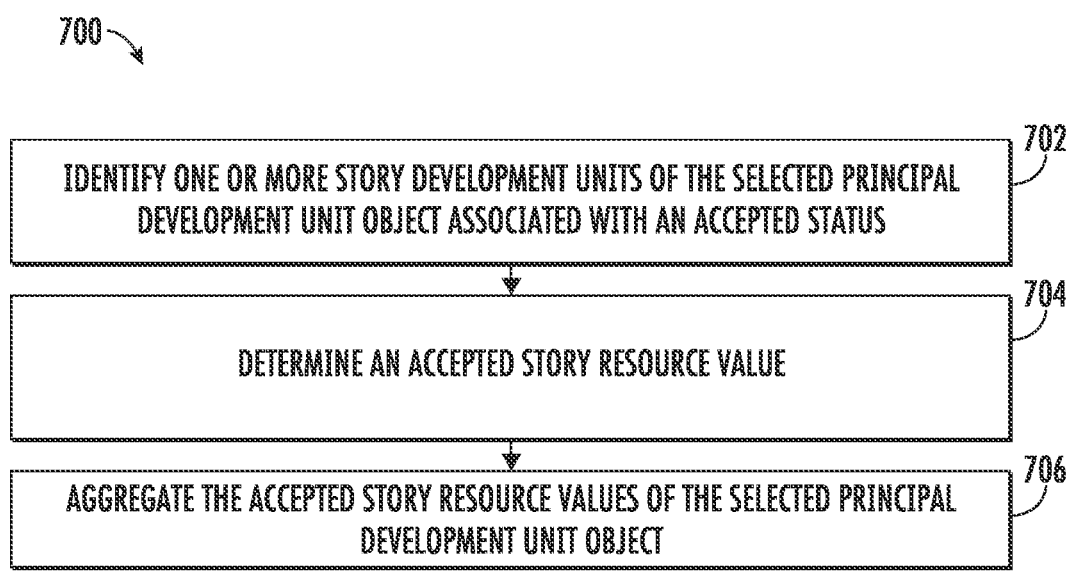
Figure 8:
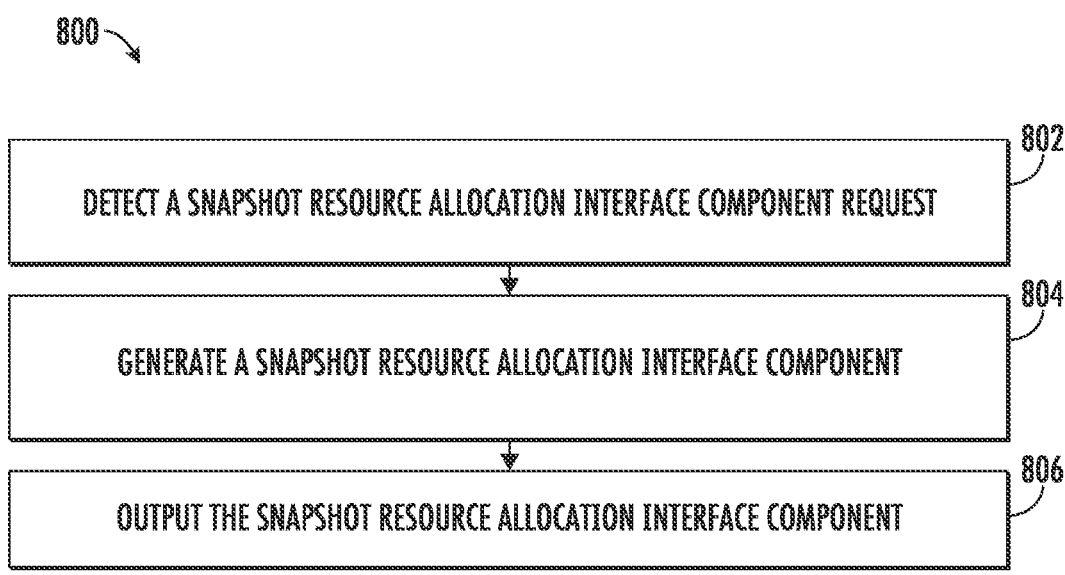

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings:

FIG. 1 illustrates an example project management system configured to communicate with one or more client devices in accordance with some example embodiments described herein;

FIG. 2 is a schematic block diagram of example circuitry for use in a normalizing resource estimate aggregation interface server in accordance with some example embodiments described herein;

FIG. 3A illustrates an example normalizing resource estimate aggregation interface component associated with a portfolio view of a project management user interface, the normalizing resource estimate aggregation interface component structured in accordance with some example embodiments described herein;

FIG. 3B illustrates an example normalizing resource estimate aggregation interface component structured in accordance with some example embodiments described herein;

FIG. 3C illustrates an example detailed normalizing resource estimate interface component structured in accordance with some example embodiments described herein;

FIG. 4A is a flowchart for generating a normalizing resource estimate aggregation interface component in accordance with some example embodiments described herein;

FIG. 4B is a signal diagram of an example data flow in accordance with some example embodiments described herein;

FIG. 5 is a flowchart for determining the predicted resource value for a selected principal development unit object in accordance with some example embodiments described herein;

FIG. 6 is a flowchart for determining the expected resource value for a selected principal development unit object in accordance with some example embodiments described herein;

FIG. 7 is a flowchart for determining the accepted resource value for a selected principal development unit object; and FIG. 8 is a flowchart for generating and outputting a snapshot resource allocation interface component in accordance with some example embodiments described herein.

DETAILED DESCRIPTION

One or more embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to a server or client device as an example "apparatus." However, elements of the apparatus described herein may be equally applicable to the claimed system, method, and computer program product. Accordingly, use of any such terms should not be taken to limit the spirit and scope of embodiments of the present disclosure.

Overview

Various embodiments of the present disclosure are directed to improved apparatuses, methods, systems, and computer program products for generating and outputting a normalizing resource estimate aggregation interface component in a project management system. Project management systems enable users to coordinate, plan, track, manage, and/or otherwise monitor one or more development projects. In an agile project management system, a primary or top-level objective, theme, or initiative aligns users, provides context, and otherwise informs strategic decisions in an effort to align the development projects of an organization. Such primary objective and underlying development projects can be further broken down in a hierarchical manner to smaller actionable work items in a de-centralized environment such that the work items can be assigned to one or more team members in a series of iterations. Compared to a linear project in traditional project management, the adaptive work structure of agile project management allows for continuous evaluation and improved response to unanticipated changes experienced during development projects.

The inventors have determined it would be desirable and advantageous to be able to reliably predict, monitor, and otherwise measure resource investment and allocation of higher level work items, such as at the portfolio and/or enterprise level of an organization, using the estimations, progress, and performance of lower level work items in association with a project management system. However, higher level work items may span long periods of time and the iterative nature of agile project management impedes the use of such underlying lower level metrics at the enterprise level. For example, a higher level work item that spans three quarters may only have resource allocations and estimations broken out and planned with respect to lower level work items in the first, or nearest in time, quarter. It is undesirable to predict and measure resource investment and allocation of higher level work items based only on those lower level work items that have been planned, as it results in inaccurate and invaluable performance metrics. However, it is also undesirable, inefficient, and counter-intuitive to the underlying purpose and adaptability of agile project management to require lower level work items to be broken out and planned at great lengths in the distant future.

In addition, the iterative outputs, deliverables, and data resulting from the flexible and adaptive nature of agile project management are often not linear, consistent, or homogenous. Even the methodologies, considerations, and techniques underlying the scheduling of resources, including projections of effort required to complete work items, can be dissimilar and vary widely across teams, scrums, sprints, and projects. One example context is in a software development project utilizing agile project management wherein the effort expended for 10 story points accepted by Team A in a sprint is not necessarily the same effort expended for 10 story points accepted by Team B in a sprint. Any number of variables can affect such projections and resources, such as the number of team members, the composition of a team unit, and the length of time associated with the accepted story points. Such variables fail to provide an efficient and/or effective mechanism for comparing or accounting for disparate and distinct resources in an accurate and efficient manner. Such inconsistencies, disparate data, and relative estimations at the fundamental delivery or team level would only be further exacerbated when combined, compounded, and rolled up into higher level work items, failing to enable portfolio-level consideration of the multiple resource investments and allocations associated with a particular higher level work item. Accordingly, the inventors have determined it would be desirable and advantageous to be able to cull, reconcile, and normalize the myriad of dissimilar and extensive resource estimations, considerations, data sets, and progress associated with the lower level work items and use such reconciled and converted data to provide informed predictions and measurements of resource investment and allocation of higher level work items.

Accordingly, to overcome these problems and others, various embodiments of the present disclosure relate generally to outputting a normalizing resource estimate aggregation interface component, such normalizing resource estimate aggregation interface component structured to provide presentation of improved determinations of resource investment and allocation in principal development unit objects, such as, but not limited to epics, projects, or themes, based on resource data associated with subsidiary development units, such as projects, stories, sprints, and tasks. Example embodiments of the present disclosure include detecting a normalizing resource estimate aggregation interface component request, accessing resource data, determining a current normalized program resource per estimation unit, determining a predicted resource value, an expected resource value, and an accepted resource value for each principal development unit object, generating the normalizing resource estimate aggregation interface component, and outputting the normalizing resource estimate aggregation interface component for rendering to a project management user interface.

Enabling a more realistic scope and predicted commitment metrics without requiring mapping out of additional tasks and resources before work begins advantageously improves resource planning and supports the purpose of agile project management. In addition, providing such improved metrics to users in a clear and easy interface component further supports users in getting a more accurate feel for resource investments and allocations, progress, and scope of work to be performed. That is, by normalizing and aggregating resource data to provide a myriad of predicted, expected, and accepted resource values in a normalizing resource estimate aggregation interface component, the system's ability to display information and interact with the user is improved. As such, systems structured in accordance with various embodiments of the present disclosure provide specific, technical solutions to technical problems faced by existing systems, the details of which are described hereafter.

The inventors have further determined that because the varied data inputted and outputted in an agile project management environment is not necessarily comparable as well as being extensive, it would be advantageous to leverage artificial intelligence and train a machine learning model with such a dissimilar aggregate of data in order to determine one or more of a current normalized program resource per estimation unit, a predicted resource value, an expected resource value, an accepted resource value, a universal estimation system conversion variable, and the like, the machine learning model thereby informing the normalizing resource estimate aggregation interface component, in near real-time or real-time, to provide resource investment and allocation insight to the user.

Moreover, at least some embodiments of the present disclosure frequently snapshot and/or baseline relevant resource data and perform such determinations on a frequent basis in the background of the project management system, thereby reducing computational load on the project management system, otherwise reducing strain on the system when providing real-time determinations, and providing a low latency user experience. As such, the system's ability to display information and interact with the user is improved. To provide context, the user experiences lower latency due to the utilization of aggregated metrics and the optimization of computing source allocation. As such, systems structured in accordance with various embodiments of the present disclosure may reduce computing resource consumption and provide specific, technical solutions to technical problems faced by such systems, the details of which are described hereafter.

These characteristics as well as additional features, functions, and details are described below. Similarly, corresponding and additional embodiments are also described below. The various implementations of the normalizing resource estimate aggregation interface component of the present disclosure is not limited to displaying normalized and aggregated resource data associated with a selected principal development unit object in a project management system. The normalizing resource estimate aggregation interface components of the present disclosure may be used as part of a standalone service, application, or device or they may be applied as a layer atop an existing service, application, or device (e.g., an existing project management system). Additionally or alternatively, the normalizing resource estimate aggregation interface server of the present disclosure may be used to determined and/or programmatically determine, and the normalizing resource estimate aggregation interface components of the present disclosure may be used to display, normalized and aggregated resource data associated with other objects in a project management system, such as goals, objectives, key results, products, IT assets, business domains, customer journeys, and/or the like, based at least in part on such object's relationship or association with level of effort or work.

Definitions

The term "project management system" refers to the software platform(s) and associated hardware that is configured to support, maintain, and manage a plurality of projects, workflows, and all associated functionality. Example project management systems comprise supporting server(s), repositor(ies), and client device(s), and in some embodiments, are further configured to engage with external resources and external applications.

The term "project management user interface" refers to a graphical user interface of a project management system that is configured to enable users to view and engage with one or more project management workspaces and/or the project management system. A project management user interface is rendered to a client device based on data and instructions provided by the project management system. In some embodiments, such data and instructions are facilitated by a dedicated software application running on the client device. In other embodiments, such data and instructions are provided through a web browser running on the client device. A non-limiting example of a project management user interface includes a portfolio view interface associated with, inter alia, tracking resource investment and allocation and development unit progress across multiple development units (e.g., multiple projects of an epic).

The term "normalizing resource estimate aggregation interface component" refers to a graphical user interface or sub-user interface of a project management system that is configured to display a variety of normalized resource metrics information associated with a selected development unit. A normalizing resource estimate aggregation interface component is rendered to a client device based on data and instructions provided by the project management system (e.g., normalizing resource estimate aggregation interface server). In some embodiments, such data and instructions are facilitated by a dedicated software application running on the client device. In other embodiments, such data and instructions are provided through a web browser running on the client device. In some embodiments, the normalizing resource estimate aggregation interface component is configured to display one or more levels of information. For example, FIGS. 3A and 3B illustrate an example embodiment of a normalizing resource estimate aggregation interface component 301 exposing a first level or summary presentation of information in association with a portfolio view of a project management user interface 300. FIG. 3C illustrates an example embodiment of a "detailed normalizing resource estimate aggregation interface component" 311 exposing a second level or detailed presentation of information in association with a portfolio view of a project management user interface 300.

The term "normalizing resource estimate aggregation interface component request" refers to an electrically generated digital object that is created by or otherwise originates from a computing device requesting generation and output of a normalizing resource estimate aggregation interface component with respect to a particular user. In this regard, a normalizing resource estimate aggregation interface component request causes initiation of a process that may culminate in rendering a normalizing resource estimate aggregation interface component to a project management user interface. In some embodiments, a normalizing resource estimate aggregation interface component request is represented via a temporary code that is generated by and/or transmitted from a computing device (e.g., client device) to a project management system (e.g., normalizing resource estimate aggregation interface component server) as an indication that a client device has made the request. In some embodiments, the normalizing resource estimate aggregation interface component request is associated with a variety of metadata such as one or more of a user identifier, a portfolio identifier, and/or other data for use in generating, managing, and/or otherwise supporting a normalizing resource estimate aggregation interface component as described herein. In some embodiments, a normalizing resource estimate aggregation interface component request is associated with a display detailed resource estimate interface component request and/or a snapshot resource allocation interface component request.

The term "display detailed resource estimate interface component request" refers to an electrically generated digital object that is created by or otherwise originates from a computing device requesting generation and output of a detailed normalizing resource estimate aggregation interface component with respect to a particular user. In this regard, a display detailed resource estimate interface component request causes initiation of a process that may culminate in rendering a detailed normalizing resource estimate aggregation interface component to a project management user interface. In some embodiments, a display detailed resource estimate interface component request is represented via a temporary code that is generated by and/or transmitted from a computing device (e.g., client device) to a project management system (e.g., normalizing resource estimate aggregation interface component server) as an indication that a client device has made the request. In some embodiments, the display detailed resource estimate interface component request is associated with a variety of metadata such as one or more of a user identifier, a portfolio identifier, and/or other data for use in generating, managing, and/or otherwise supporting a detailed normalizing resource estimate aggregation interface component as described herein.

The term "snapshot resource allocation interface component" refers to a graphical user interface or sub-user interface of a project management system that is configured to display a snapshot of resource metrics information associated with a selected development unit. A snapshot resource allocation interface component is rendered to a client device based on data and instructions provided by the project management system (e.g., normalizing resource estimate aggregation interface server). In some embodiments, such data and instructions are facilitated by a dedicated software application running on the client device. In other embodiments, such data and instructions are provided through a web browser running on the client device.

The term "snapshot resource allocation interface component request" refers to an electrically generated digital object that is created by or otherwise originates from a computing device requesting generation and output of a snapshot resource allocation interface component with respect to a particular user. In this regard, a snapshot resource allocation interface component request causes initiation of a process that may culminate in rendering a snapshot resource allocation interface component request to a project management user interface. In some embodiments, a snapshot resource allocation interface component request is represented via a temporary code that is generated by and/or transmitted from a computing device (e.g., client device) to a project management system (e.g., normalizing resource estimate aggregation interface component server) as an indication that a client device has made the request. In some embodiments, the snapshot resource allocation interface component request is associated with a variety of metadata such as one or more of a user identifier, a portfolio identifier, and/or other data for use in generating, managing, and/or otherwise supporting a snapshot resource allocation interface component as described herein. In some embodiments, a snapshot resource allocation interface component request is associated with a display detailed resource estimate interface component request and/or a normalizing resource estimate aggregation interface component request.

The term "normalizing resource estimate aggregation interface server" refers to a software platform and associated hardware that is configured to manage the various normalizing resource estimate aggregation interface components and associated functionality of the project management system. The normalizing resource estimate aggregation interface server is accessible via one or more computing devices, is configured to receive various requests (e.g., normalizing resource estimate aggregation interface component request(s), display detailed normalizing resource estimate interface component request(s), snapshot resource allocation interface component request(s), and/or the like), and access one or more data repositories such as a resource repository. The functionality of the normalizing resource estimate aggregation interface component server may be provided via a single server or collection of servers having a common functionality, or the functionality of the normalizing resource estimate aggregation interface component server may be segmented among a plurality of servers or collections of servers (e.g., a cloud networking environment, microservices, and/or the like) performing subsets of the described functionality of the normalizing resource estimate aggregation interface component server.

The term "portfolio identifier" refers to one or more items of data by which a portfolio may be identified within a project management system. For example, a portfolio identifier may comprise text string(s), numerical character(s), alphabetical character(s), alphanumeric code(s), American Standard Code for Information Interchange (ASCII) character(s), a pointer, an Internet Protocol (IP) address, a MAC address, a memory address, other unique identifier, or a combination thereof.

The term "user identifier" refers to one or more items of data by which a user may be identified within a project management system. For example, a user identifier may comprise one or more of ASCII text, encryption keys, identification certificates, a pointer, an IP address, a URL, a MAC address, a memory address, or other unique identifier, or combinations thereof.

The term "development unit" or "development unit object" refers to a fundamental work development component, part, event and the like in a project development cycle within a project management system. In some embodiments, a development unit comprises one or more smaller, subsidiary development units or increments. For example, to provide context, a large, higher level development unit, such as an epic, initiative, or program, is delivered in one or more smaller "subsidiary development units", such as user stor(ies), sprint(s), task(s), feature(s), defect(s), or "functionality development units". Non-limiting examples of a development unit include a theme, an epic, an initiative, a program, a project, a sprint, a user story (e.g. "story development unit"), an issue, a task, a feature, a defect, a work item, a work unit (e.g., a unit or version of code), an iteration, a Kanban, and/or the like. An epic is a non-limiting example of a "principal development unit object". A program is a non-limiting example of a "program development unit". In some embodiments, certain subsidiary development units (e.g., functionality development units, sprint development units, and/or the like) are associated with more than one program development unit. In certain embodiments, such subsidiary development units are assigned to a primary program development unit based on satisfaction of a relational activity threshold.

As used herein, the term "development unit identifier" refers to one or more items of data by which a development unit may be uniquely identified within a project management system. For example, a development unit identifier may comprise one or more of ASCII text, encryption keys, identification certificates, a pointer, an IP address, a URL, a MAC address, a memory address, or other unique identifier, or combinations thereof.

As used herein, the term "development unit status identifier" refers to one or more items of data by which the current status (e.g., future, active, accepted, completed, past, planned, unplanned, and the like) of a development unit is identified within a project management system.

The terms "team" or "team unit" refer to a set of team members. In some embodiments, an "active" team or team unit refers to a team or team unit satisfying an activity threshold associated with a development unit, such that data associated with the team or team unit is used in predictions, estimations, and calculations of values associated with the development unit.

The terms "team identifier" or "team ID" refer to one or more items of data by which a team or team unit comprising one or more team members may be uniquely identified within a project management system. For example, a team identifier may comprise one or more of ASCII text, encryption keys, identification certificates, a pointer, an IP address, a URL, a MAC address, a memory address, or other unique identifier, or combinations.

The terms "planning increment identifier" or "PI identifier" refer to one or more items of data by which a planning increment may be uniquely identified within a project management system. For example, a planning increment identifier or PI identifier may comprise one or more of ASCII text, encryption keys, identification certificates, a pointer, an IP address, a URL, a MAC address, a memory address, or other unique identifier, or combinations.

The term "resource data" refers to one or more items of data related to resources within a project management system, including but not limited to, user identifier(s), development unit identifier(s), PI identifier(s), team identifier(s), resource value identifier(s), non-normalized accepted estimation unit value(s), normalized program resource per estimation unit (e.g., baselined), PI prediction resource value(s), PI estimation unit prediction(s), functionality development unit resource estimation value(s), functionality estimation unit prediction, normalized program resource per estimation unit, and/or the like.

The term "resource data repository" refers to a location, such as a database stored on a memory device, which is accessible by one or more computing devices for retrieval and storage of resource data and other data associated with normalizing resource estimate aggregation interface components. For example, the resource data repository includes one or more of user identifier(s), development unit identifier(s), planning increment identifier(s), team identifier(s), resource value identifier(s), non-normalized accepted estimation unit value(s), baselined data and values, and/or the like. The resource data repository may be a dedicated device and/or a part of a larger repository. The resource data repository may be dynamically updated or be static. In some embodiments, the resource data repository is encrypted in order to limit unauthorized access of such resource data.

The term "predicted resource value" refers to a data value associated with a principal development unit object, the data value representing a predicted measure of resources to be allocated or invested in the principal development unit object based on an aggregation of normalized data associated with underlying predictions for one or more program development units. The predicted resource value is determined and/or programmatically generated by a normalizing resource estimate aggregation interface component server based at least in part on an analysis of resource data, including but not limited to one or more of planning increment predicted resource value(s) (e.g., current and/or baselined), normalized program resource per estimation unit (e.g., current and/or baselined), planning increment estimation unit prediction(s), (e.g., current and/or baselined), and/or the like.

In some embodiments, the predicted resource value may provide insight into a scope of resource allocation or investment early on in the lifecycle of a principal development unit. In certain embodiments, the predicted resource value is generated by aggregating the product of each planning increment estimation unit prediction and a normalized program resource per estimation unit associated with the corresponding program development unit. In a non-limiting contextual example, early in the lifecycle, child functionality development units are yet to be defined and broken out with respect to an epic development unit, however, teams associated with the epic development unit have started projecting work effort (e.g., intended commitment as assigned) needed for one or more planning increments in program development units associated with the epic development unit. The predicted resource value provides an indication to the user of how work effort compares against a predicted budget early on in the lifecycle. In some embodiments, the predicted resource value is outputted from the normalizing resource estimate aggregation interface component server to a normalizing resource estimate aggregation interface component for display to a user.

The term "expected resource value" refers to a data value associated with a principal development unit object, the data value representing a measure of estimated allocation or investment of resources based on an aggregation of normalized data associated with underlying predictions for one or more functionality development units. The expected resource value is determined and/or programmatically generated by a normalizing resource estimate aggregation interface component server based at least in part on an analysis of resource data, including but not limited to one or more of functionality expected resource value(s), normalized program resource per estimation unit (e.g., current and/or baselined), functionality estimation unit prediction(s), (e.g., current and/or baselined), and/or the like. In certain embodiments, the expected resource value is generated by aggregating the product of each functionality estimation unit prediction and a normalized program resource per estimation unit associated with the program development unit. In a non-limiting contextual example, when teams associated with the epic development unit have started defining, breaking out, and projecting work effort (e.g., intended commitment as assigned) with respect to some specific functionality development units associated with the epic development unit, the expected resource value may provide additional insight into a scope of resource allocation or investment of a principal development unit, as compared to predicted resource value. In some embodiments, the expected resource value provides an indication to the user of how work effort compares against a predicted budget, somewhat later as compared to the predicted resource value, but still early on in the lifecycle. In some embodiments, the expected resource value is outputted from the normalizing resource estimate aggregation interface component server to a normalizing resource estimate aggregation interface component for display to a user.

The term "accepted resource value" refers to a data value associated with a principal development unit object, the data value representing a measure of accepted allocation or investment of resources based on an aggregation of data associated with underlying predictions for one or more accepted story development units. The accepted resource value is determined and/or programmatically generated by a normalizing resource estimate aggregation interface component server based at least in part on an analysis of resource data, including but not limited to one or more of accepted story resource value(s), team resource per estimation unit(s), work effort value(s), sprint identifier(s), and/or the like. In certain embodiments, the accepted resource value is generated by aggregating the product of each accepted story development unit's current work effort value and a team resource per estimation unit for the sprint development unit in which the corresponding work was delivered. In some embodiments, the accepted resource value is outputted from the normalizing resource estimate aggregation interface component server to a normalizing resource estimate aggregation interface component for display to a user.

The term "resource value identifier" refers to one or more items of data by which a resource value (e.g., predicted resource value, expected resource value, accepted resource value, and/or the like) may be uniquely identified within a project management system. For example, a resource value identifier may comprise one or more of ASCII text, encryption keys, identification certificates, a pointer, an IP address, a URL, a MAC address, a memory address, or other unique identifier, or combinations.

The term "team resource per development unit" refers to a data value associated with a team unit, the data value representing a measure of resource allocation or investment with respect to the team unit, based upon an allocation of resources in one or more defined development units, such as sprint development units. The team resource per development unit is determined and/or programmatically generated by a normalizing resource estimate aggregation interface component server based at least in part on an analysis of resource data. In a non-limiting contextual example, a team resource per development unit is an approximated labor expenditure associated with a team based on an analysis of one or more of number of team members, number of days in the defined development unit, maximum work threshold (e.g., burn hours or maximum number of hours a team member is expected to spend daily on a task or work item), blended rates associated with team members, and/or the like. In some embodiments, the team resource per development unit associated with a sprint development unit is stored (e.g., baselined) at the completion of such sprint development unit (e.g., to preserve data and mitigate rolling values no longer relevant).

The term "team resource per estimation unit" refers to a data value associated with a team unit, the data value representing a measure of resource allocation or investment with respect to the team unit, per estimation unit, associated with a defined development unit, such as a sprint development unit. The team resource per estimation unit is determined and/or programmatically generated by a normalizing resource estimate aggregation interface component server based at least in part on an analysis of resource data. In a non-limiting contextual example wherein estimation units are story points and the resource type utilized to develop the resource values is financial cost, the team resource per development unit associated with Team A in Sprint 1 is $1,000 and Team A delivered 10 accepted story points in Sprint 1. In this non-limiting contextual example, the team resource per estimation unit is $100 per story point for Team A with respect to Sprint 1. In some embodiments, the team resource per estimation unit is non-normalized. That is, the methodology for estimating effort or level of work associated with a development unit is relative to each team unit, such that each team unit is associated with a relative estimation unit valuation scale. Even the underlying type of estimation unit used in such methodologies can vary from team unit to team unit. Non-limiting examples of types of estimation units include story points, units of time, units of work, work hours, issue count, T-shirt size (etc., XS, S, M, L, XL), member weeks, team weeks, user-customized, and the like. In some embodiments, the team resource per estimation unit is normalized with respect to a common estimation unit valuation scale across a plurality of development units based at least in part on a universal estimation system conversion variable.

The term "estimation unit valuation scale" refers to a measurement of the estimated effort or level of work associated with a development unit or defined amount of time. Non-limiting examples of estimation units include story points, units of time, units of work, issue count, work hours, T-shirt size (etc., XS, S, M, L, XL), member weeks, team weeks, user-customized, and the like. In some embodiments, estimation unit valuation scales are relative and each estimation unit valuation scale is associated with a team identifier. That is, in a non-limiting example, the estimated effort expended for 10 story points as accepted by Team A is not necessarily the same estimated effort expended for 10 story points accepted for Team B. In some embodiments, estimation unit valuation scales are standardized to a common estimation unit valuation scale based on a universal estimation system conversion variable. For example, a universal estimation system conversion variable comprises a defined level of effort that a team member delivers in a defined amount of time (e.g., a person delivers 5 story points in 1 member week such that 1 story point is 0.2 member weeks) such that the common estimation unit valuation scale is a linear scale. In a non-limiting contextual example, the universal estimation system conversion variable is 5 story points in 1 member week, thereby defining a universal linear scale of 0-5, wherein "0" is associated with a team's lowest average team velocity (e.g., amount of work completed in a single development unit, such as sprint development unit) and "5" is associated with a team's rolling average of accepted work over a set of subsidiary development units (e.g., n number of sprint development units).

The term "universal estimation system conversion variable" is a global conversion factor or data value utilized to define a common estimation unit valuation scale in a project management system. In some embodiments, the universal estimation system conversion variable is defined by one or more users of the project management system. In some embodiments, the universal estimation system variable is programmatically generated by a normalizing resource estimate aggregation interface component server based at least in part on an analysis of resource data. In certain embodiments, a normalizing resource estimate aggregation interface component server comprises a machine learning model designed to leverage artificial intelligence in connection with the determination of a universal estimation system variable. In determining the universal estimation system variable, the machine learning model may draw from a range of information sources, including for example, any one or more of the data described herein (e.g., resource data and/or the like) and correlations thereof can be used in connection with the machine learning model. Moreover, in an aspect, the machine learning based model employed can be trained using such resource data and/or the like.

The term "non-normalized accepted estimation unit value" refers to a relative measurement of the accepted estimated effort of work associated with a development unit (e.g., sprint development unit) by the associated team unit. In some embodiments, a normalized accepted estimation unit value is generated by normalizing a non-normalized accepted estimation unit value based at least in part on a universal estimation system conversion variable. In some embodiments, such normalization is based on an analysis of the non-normalized accepted estimation unit value, an average team velocity associated with the team unit, a universal estimation system conversion variable, a number of team members associated with the team unit, and the number of weeks associated with the selected sprint development unit.

The term "program resource per estimation unit" refers to a data value associated with a program development unit object, the data value representing a measure of resource allocation or investment with respect to a program development unit per estimation unit. The program resource per estimation unit is determined and/or programmatically generated by a normalizing resource estimate aggregation interface component server based at least in part on an analysis of resource data. In some embodiments, the program resource per estimation unit is based on an average of the team resource per estimation units (e.g., average team velocity) associated with each team unit associated with the program development unit for a set of subsidiary development units (e.g., 5, 10, n sprint development units). In certain embodiments, the program resource per estimation unit is based on a rolling average of the team resource per estimation units associated with each team unit associated with the program development unit for the last n most recent sprint development units. In some embodiments, the program resource per estimation unit is non-normalized such that the underlying values (e.g., team resource per estimation units) are not adjusted to a common or universal scale prior to rolling such values into the program resource per estimation unit. In some embodiments, the program resource per estimation unit is normalized such that the team resource per estimation units are adjusted using a global conversion variable to standardize such define team resource per estimation units to a common estimation unit valuation scale prior to rolling such values into the program resource per estimation unit.

In a non-limiting contextual example, incremental normalized program resource per estimation units are determined and/or programmatically generated for n sprint development units and the normalized program resource per estimation unit for the program development unit is generated as an average of the aggregation of such n incremental normalized program resource per estimation units (e.g., a rolling average). Predicted and expected resource values associated with higher level principal development units utilizing such normalized program resource per estimation unit provide improved insight to users as a result of such normalization, aggregation, and rolling averages. In some embodiments, a normalized program resource per estimation unit is a current normalized program resource per estimation unit when it is associated with an in progress development unit or planning increment such that the normalized program resource per estimation unit is determined in real time or near real time based on real time or near real time underlying data. A normalized program resource per estimation unit is a baselined normalized program resource per estimation unit when it is stored in association with a completed or accepted development unit. In some embodiments, a baselined normalized program resource per estimation unit is the current normalized program resource per estimation unit that coincided with the completion or acceptance of a development unit and was stored in associated with such completed or accepted development unit.

In some embodiments, the program resource per estimation unit is programmatically generated by a normalizing resource estimate aggregation interface component server based at least in part on an analysis of resource data. In certain embodiments, a normalizing resource estimate aggregation interface component server comprises a machine learning model designed to leverage artificial intelligence in connection with the determination of a program resource per estimation unit. In determining the program resource per estimation unit, the machine learning model may draw from a range of information sources, including for example, any one or more of the data described herein (e.g., resource data and/or the like) and correlations thereof can be used in connection with the machine learning model. Moreover, in an aspect, the machine learning based model employed can be trained using such resource data and/or the like.

The term "planning increment" refers to a timeboxed period, time interval, or unit of time during which certain defined work and/or deliverables are to be completed. For example, in some embodiments, a planning increment is defined by a specified start date and a specified end date (e.g., a calendar quarter, a fiscal year, or the like). In other embodiments, a planning increment corresponds to a specified number of development units (e.g., 5 sprints). In some embodiments, a planning increment is defined by a user. In other embodiments, a planning increment is defined by the normalizing resource estimate aggregation interface component server.

The term "planning increment predicted resource value" refers to a data value associated with a planning increment of a program development unit, the data value representing a predicted measure of resources to be allocated or invested with respect to the selected planning increment based on an aggregation of normalized data associated with underlying predictions for one or more program development units. The planning increment predicted resource value is determined and/or programmatically generated by a normalizing resource estimate aggregation interface component server based at least in part on an analysis of resource data, including but not limited to one or more of normalized program resource per estimation unit (e.g., current and/or baselined), planning increment estimation unit prediction(s), (e.g., current and/or baselined), and/or the like.

The term "program increment estimation unit prediction" refers to a data value associated with a planning increment of a program development unit, the data value representing a predicted measure of resources to be allocated or invested with respect to the selected planning increment.

The term "functionality resource estimation value" refers to a data value associated with a functionality development unit (e.g., a feature), the data value representing a predicted expenditure of resources.

The term "functionality estimation unit prediction" refers to a data value associated with a functionality development unit (e.g., a feature), the data value representing a predicted measure of resources to be allocated or invested with respect to the selected functionality development unit. In some embodiments, users can define the functionality estimation unit prediction via user interaction with the project management system 200. In still certain embodiments, the functionality estimation unit prediction can be supplied by a user using any estimation methodology or system (e.g., member weeks, team weeks, T-shirt size, or the like), and the normalizing resource estimate aggregation interface component server determines a standardized functionality estimation unit prediction (e.g., story points) based on a universal estimation system conversion variable. Additionally or alternatively, in some embodiments, such functionality estimation unit prediction is programmatically generated by a normalizing resource estimate aggregation interface component server based at least in part on an analysis of resource data. In certain embodiments, a normalizing resource estimate aggregation interface component server comprises a machine learning model designed to leverage artificial intelligence in connection with the determination of a functionality estimation unit prediction. In determining the functionality estimation unit prediction, the machine learning model may draw from a range of information sources, including for example, any one or more of the data described herein (e.g., resource data and/or the like) and correlations thereof can be used in connection with the machine learning model. Moreover, in an aspect, the machine learning based model employed can be trained using such resource data and/or the like.

The terms "client device", "computing device", "user device", and the like may be used interchangeably to refer to computer hardware that is configured (either physically or by the execution of software) to access one or more of an application, service, or repository made available by a server (e.g., apparatus of the present disclosure) and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user. In some embodiments, an association is created by a client device transmitting authentication information associated with the user to the project management system (e.g., normalizing resource estimate aggregation interface component server).

The terms "data," "content," "digital content," "digital content object," "signal", "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "application," "software application," "app," "product," "service" or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked or remote computing devices, such as, but not limited to, client devices. Non-limiting examples of an application comprise project management, workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The terms "project management application" or "project management app" refer to a dedicated software program, application, platform, service, web browser, or computer-executable application software programmed or configured to run on a client device which provides the user access to the project management system and its associated functionality. In some embodiments, the project management application may include hardware, software, or combinations thereof operating remotely (e.g., on a server). In some embodiments, the project management application is designed to execute on mobile devices, such as tablets or smartphones. For example, in certain embodiments, an app is provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Example System Architecture

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. In particular, FIG. 1 illustrates an example project management system 200 configured to communicate with one or more client devices 101A-101N in accordance with some example embodiments described herein. Users may access a project management system 200 via a communications network 102 using one or more of client devices 101A-101N. Project management system 200 may comprise a normalizing resource estimate aggregation interface component server 210 in communication with at least one repository, such as resource data repository 215. Such repository(ies) may be hosted by the normalizing resource estimate aggregation interface component server 210 or otherwise hosted by devices in communication with the normalizing resource estimate aggregation interface component server 210. The project management system 200 is, in some embodiments, able to generate and output a normalizing resource estimate aggregation interface component for rendering to project management user interface associated with a user identifier, as will be described below.

Normalizing resource estimate aggregation interface component server 210 may include circuitry, networked processors, or the like configured to perform some or all of the normalizing resource estimate aggregation interface component server-based processes described herein (e.g., detecting normalizing resource estimate aggregation interface component request(s), generating and/or transmitting commands and instructions for rendering a normalizing resource estimate aggregation interface component to one or more client devices 101A-101N, using data from, for example, resource data repository 215), and may be any suitable network server and/or other type of processing device. In this regard, the normalizing resource estimate aggregation interface component server 210 may be embodied by any of a variety of devices, for example, the normalizing resource estimate aggregation interface component server 210 may be embodied as a computer or a plurality of computers. For example, normalizing resource estimate aggregation interface component server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, normalizing resource estimate aggregation interface component server 210 may be located remotely from the resource data repository 215, although in other embodiments, the normalizing resource estimate aggregation interface component server 210 may comprise the resource data repository 215. The normalizing resource estimate aggregation interface component server 210 may, in some embodiments, comprise several servers or computing devices performing interconnected and/or distributed functions. Despite the many arrangements contemplated herein, normalizing resource estimate aggregation interface component server 210 is shown and described herein as a single computing device to avoid unnecessarily overcomplicating the disclosure.

Normalizing resource estimate aggregation interface component server 210 can communicate with one or more client devices 101A-101N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the project management system 200.

Resource data repository 215 may be stored by any suitable storage device configured to store some or all of the information described herein (e.g., memory 201 of the normalizing resource estimate aggregation interface component server 210 or a separate memory system separate from the normalizing resource estimate aggregation interface component server 210, such as one or more database systems, backend data servers, network databases, cloud storage devices, or the like provided by another device (e.g., online application or 3rd party provider), such as a Network Attached Storage (NAS) device or devices, or as a separate database server or servers). Resource data repository 215 may comprise data received from the normalizing resource estimate aggregation interface component server 210 (e.g., via a memory 201 and/or processor(s) 202) and/or a client device 101A-101N, and the corresponding storage device may thus store this data. Resource data repository 215 includes information accessed and stored by the normalizing resource estimate aggregation interface component server 210 to facilitate the operations of the project management system 200. As such, resource data repository 215 may include, for example, without limitation, portfolio identifier (s), user identifier(s), team identifier(s), resource value identifier(s), development unit identifier(s), and/or the like.

The client devices 101A-101N may be implemented as any computing device as defined above. That is, the client devices 101A-101N may also include circuitry, networked processors, or the like configured to perform some or all of the apparatus-based processes described herein, and may include a suitable network server and/or other type of processing device (e.g., a controller or computing device of the client devices 101-101N). Electronic data received by the normalizing resource estimate aggregation interface component server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the collaborative contextual summary interface to a user and otherwise providing access to the project management system 200. The depictions in FIG. 1 of "N" client devices are merely for illustration purposes. According to some embodiments, the client devices 101A-101N may be configured to display an interface on a display of the client device for viewing, editing, and/or otherwise interacting with at least one normalizing resource estimate aggregation interface component, which may be provided by the project management system 200.

In embodiments where a client device 101A-101N is a mobile device, such as a smartphone or tablet, the client device 101A-101N may execute an "app" to interact with the project management system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the project management system 200 via a web browser. As yet another example, the client devices 101A-101N may include various hardware or firmware designed to interface with the project management system 200.

Example Apparatus for Implementing Embodiments of the Present Disclosure

FIG. 2 shows a schematic block diagram of example circuitry, some or all of which may be included in a normalizing resource estimate aggregation interface component server 210. In accordance with some example embodiments, normalizing resource estimate aggregation interface component server 210 may include various means, such as memory 201, processor 202, input/output circuitry 203, and/or communications circuitry 204. Moreover, in some embodiments, normalizing resource estimate aggregation interface circuitry 205 may also or instead be included in the normalizing resource estimate aggregation interface component server 210. For example, where normalizing resource estimate aggregation interface circuitry 205 is included in normalizing resource estimate aggregation interface component server 210, normalizing resource estimate aggregation interface circuitry 205 may be configured to facilitate the functionality discussed herein regarding determining a current normalized program resource per estimation unit, a predicted resource value, an expected resource value, and/or an accepted resource value and generating and/or outputting normalizing resource estimate aggregation interface component(s). An apparatus, such as normalizing resource estimate aggregation interface component server 210, may be configured, using one or more of the circuitry 201, 202, 203, 204, and 205, to execute the operations described above with respect to FIG. 1 and below in connection with FIGS. 3A-8.

Although the use of the term "circuitry" as used herein with respect to components 201-205 are described in some cases using functional language, it should be understood that the particular implementations necessarily include the use of particular hardware configured to perform the functions associated with the respective circuitry as described herein. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry. It will be understood in this regard that some of the components described in connection with the normalizing resource estimate aggregation interface component server 210 may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the normalizing resource estimate aggregation interface component server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, normalizing resource estimate aggregation interface component server 210. The memory 201 is non-transitory and may include, for example, one or more volatile and/or non-volatile memories, or some combination thereof. In other words, for example, the memory 201 may be an electronic storage device (e.g., a non-transitory computer readable storage medium). The memory 201 may be configured to store information, data, content, applications, instructions, or the like, for enabling an apparatus, e.g., normalizing resource estimate aggregation interface component server 210, to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling normalizing resource estimate aggregation interface component server 210 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by normalizing resource estimate aggregation interface component server 210 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multi-threading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as normalizing resource estimate aggregation interface component server 210. The plurality of processors may be in operative communication with each other and may be collectively configured to perform one or more functionalities of normalizing resource estimate aggregation interface component server 210 as described herein.

In an example embodiment, processor 202 is configured to execute instructions stored in the memory 201 or otherwise accessible to processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause normalizing resource estimate aggregation interface component server 210 to perform one or more of the functionalities of normalizing resource estimate aggregation interface component server 210 as described herein.

In some embodiments, normalizing resource estimate aggregation interface component server 210 further includes input/output circuitry 203 that may, in turn, be in communication with processor 202 to provide an audible, visual, mechanical, or other output and/or, in some embodiments, to receive an indication of an input from a user, a client device 101A-101N, or another source. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In some embodiments, aspects of input/output circuitry 203 may be reduced as compared to embodiments where normalizing resource estimate aggregation interface component server 210 may be implemented as an end-user machine or other type of device designed for complex user interactions. In some embodiments (like other components discussed herein), input/output circuitry 203 may even be eliminated from normalizing resource estimate aggregation interface component server 210. Input/output circuitry 203 may be in communication with memory 201, communications circuitry 204, and/or any other component(s), such as via a bus. Although more than one input/output circuitry and/or other component can be included in normalizing resource estimate aggregation interface component server 210, only one is shown in FIG. 2 to avoid overcomplicating the disclosure (e.g., like the other components discussed herein).

Communications circuitry 204, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with normalizing resource estimate aggregation interface component server 210. In this regard, communications circuitry 204 may include, for example, a network interface for enabling communications with a wired or wireless communication network. For example, in some embodiments, communications circuitry 204 is configured to receive and/or transmit any data that may be stored by memory 201 using any protocol that may be used for communications between computing devices. For example, communications circuitry 204 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 204 includes circuitry for interacting with the antenna(s) to cause transmission of signals via the antenna(e) or to handle receipt of signals received via the antenna(e). These signals may be transmitted by collaborative contextual summary interface server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of normalizing resource estimate aggregation interface component server 210, such as via a bus.

In some embodiments, normalizing resource estimate aggregation interface circuitry 205 may also or instead be included and configured to perform the functionality discussed herein related to, inter alia, determining a current normalized program resource per estimation unit, a predicted resource value, an expected resource value, and/or an accepted resource value and generating and/or outputting normalizing resource estimate aggregation interface component(s). In some embodiments, normalizing resource estimate aggregation interface circuitry 205 includes hardware, software, firmware, and/or a combination of such components, configured to support various aspects of such normalizing resource estimate aggregation interface-related functionality, features, and/or services of the normalizing resource estimate aggregation interface component server 210 as described herein (e.g., designed to generate and output a normalizing resource estimate aggregation interface component based upon at least the predicted resource value, the expected resource value, and the accepted resource value for the corresponding principal development unit object(s)). It should be appreciated that in some embodiments, normalizing resource estimate aggregation interface circuitry 205 performs one or more of such exemplary actions in combination with another set of circuitry of the normalizing resource estimate aggregation interface component server 210, such as one or more of memory 201, processor 202, input/output circuitry 203, and communications circuitry 204. For example, in some embodiments, normalizing resource estimate aggregation interface circuitry 205 utilizes processing circuitry, such as the processor 202 and/or the like, to perform one or more of its corresponding operations. In a further example, in some embodiments, some or all of the functionality of normalizing resource estimate aggregation interface circuitry 205 may be performed by processor 202. In this regard, some or all of the example processes and algorithms discussed herein can be performed by at least one processor 202 and/or normalizing resource estimate aggregation interface circuitry 205. It should also be appreciated that, in some embodiments, normalizing resource estimate aggregation interface circuitry 205 may include a separate processor, specially configured field programmable gate array (FPGA), or application specific interface circuit (ASIC) to perform its corresponding functions.

Additionally or alternatively, in some embodiments, normalizing resource estimate aggregation interface circuitry 205 utilizes memory 201 to store collected information. For example, in some implementations, normalizing resource estimate aggregation interface circuitry 205 includes hardware, software, firmware, and/or a combination thereof, that interacts with resource data repository 215 and/or memory 201 to send, retrieve, update, and/or store data values embodied by and/or associated with a normalizing resource estimate aggregation interface component including, but not limited to, resource data, user identifier(s), portfolio identifier(s), team identifier(s), development unit identifier(s), resource value identifier(s), baselined planning increment predicted resource value(s), baselined planning increment estimation unit prediction(s), baselined normalized program resource per estimation unit(s), baselined functionality development unit resource estimation value(s), baselined functionality estimation unit prediction(s), and associated data that is configured for association with, for example, generating and/or outputting a normalizing resource estimate aggregation interface component, and to support the operations of the normalizing resource estimate aggregation interface circuitry 205 and the remaining circuitry. Additionally or alternatively, in some embodiments, normalizing resource estimate aggregation interface circuitry 205 utilizes input/output circuitry 203 to facilitate user output (e.g., causing rendering of one or more user interface(s) such as a normalizing resource estimate aggregation interface component), and/or to receive user input (e.g., user clicks, user taps, keyboard interactions, user gesture, and/or the like). Additionally or alternatively still, in some embodiments, the normalizing resource estimate aggregation interface circuitry 205 utilizes communications circuitry 204 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and/or other computer-readable program code portions that can be executed to control processors of the components of normalizing resource estimate aggregation interface component server 210 to implement various operations, including the examples shown herein. As such, a series of computer-readable program code portions may be embodied in one or more computer program products and can be used, with a device, normalizing resource estimate aggregation interface component server 210, database, and/or other programmable apparatus, to produce the machine-implemented processes discussed herein. It is also noted that all or some of the information discussed herein can be based on data that is received, generated and/or maintained by one or more components of the normalizing resource estimate aggregation interface component server 210. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of normalizing resource estimate aggregation interface component server 210 and client devices 101A-101N.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML, page) to a client device (e.g., for purposes of displaying information/data to and receiving user input from a user interacting with a client device or an admin user interacting with an admin device). Information/data generated at the client device (e.g., as a result of the user interaction with an admin device) can be received from the client device (e.g., client device or admin device) at the server.

In various embodiments of the present disclosure, an apparatus (e.g., normalizing resource estimate aggregation interface component server 210) is configured to generate and output a normalizing resource estimate aggregation interface component in a project management system 200. FIG. 3A illustrates an example normalizing resource estimate aggregation interface component 301 structured in accordance with various embodiments of the subject disclosure. In a non-limiting example, the depicted normalizing resource estimate aggregation interface component 301 is rendered to the project management user interface 300, for example, a portfolio view project management user interface 300 as depicted in FIG. 3A, in association with an iterative project management environment. In some embodiments, the project management user interface 300 comprises one or more of a normalizing resource estimate aggregation interface component 301, a theme interface component 310, a roadmap interface component 320, a team resource by planning increment interface component 330, and/or a snapshot resource allocation interface component 340.

Although the normalizing resource estimate aggregation interface component 301 is depicted as being arranged or rendered in a main pane of the project management user interface 300 and the theme interface component 310, roadmap interface component 320, team resource by planning increment interface component 330, and snapshot resource allocation interface component 340 are depicted as being arranged or rendered in a sidebar pane or header pane of the project management user interface 300, such depictions are for purposes of illustration and not of limitation and other suitable variations of arranging or rendering the interface components, panes, and panels to the project management user interface 300 are also contemplated by this disclosure as will be apparent to one of ordinary skill in the art. Moreover, the normalizing resource estimate aggregation interface component 301 is depicted in association with a portfolio view project management user interface, however, other project management user interfaces 300 are contemplated (e.g., Investment vs. Spend project management user interface).

The depicted normalizing resource estimate aggregation interface component 301 comprises summary presentations 305 of multiple principal development unit objects, each summary presentation 305 comprising a predicted resource value 302, an expected resource value 303, and an accepted resource value 304 for the corresponding principal development unit object, thereby exposing a first or summary level of such information. In some embodiments, the summary presentation 305 optionally comprises a development unit identifier, a principal development unit title, and/or a principal development unit budget as depicted in FIG. 3B In some embodiments, the principal development unit budget is received as a manual entry from a user. In still further embodiments, the normalizing resource estimate aggregation interface component server 210 utilizes one or more APIs to access the principal development unit budget associated with each principal development unit. In the non-limiting example depicted in FIG. 3A, the normalizing resource estimate aggregation interface component 301 comprises 4 summary presentations 305 of principal development unit objects (e.g., Epic Alpha, Epic Beta, Epic Gamma, Epic Delta). For example, with respect to Epic Gamma, the normalizing resource estimate aggregation interface component 301 reflects a predicted resource value 302 of $219,100, an expected resource value 303 of $278,999, and an accepted resource value 304 of $0.

In some embodiments, the apparatus (e.g., normalizing resource estimate aggregation interface component server 210) is configured to generate and output such normalizing resource estimate aggregation interface component for rendering to the project management user interface 300 as described herein. For example, in the embodiment depicted in FIGS. 3A and 3B, the apparatus generated and outputted the normalizing resource estimate aggregation interface component 301 for rendering to the project management user interface 300. In some embodiments, the apparatus generates and outputs the normalizing resource estimate aggregation interface component for rendering to the project management user interface 300 in response to detecting and/or receiving a normalizing resource estimate aggregation interface component request.

For example, in some embodiments, a user accesses normalizing resource estimate aggregation interface component 301 by verbal command, gesture, on-screen dynamics (e.g., soft key), or other user interaction with the computing device wherein the user causes the computing device to generate a normalizing resource estimate aggregation interface component request. For example, in some embodiments, the user interacts with, for example, a specific portfolio view actuator button (e.g., "Portfolio Room") rendered on a visual display of the client device 101A that, when selected by the user, causes the client device 101A to generate a normalizing resource estimate aggregation interface component request. For example, in instances wherein the apparatus is a normalizing resource estimate aggregation interface component server 210, in response to the user clicking or activating the "Portfolio Room" actuator button displayed in association with project management user interface, the client device 101A generates and transmits a temporary code representative of a normalizing resource estimate aggregation interface component request with is detected by the normalizing resource estimate aggregation interface component server 210. In response to detection of the a normalizing resource estimate aggregation interface component request, the a normalizing resource estimate aggregation interface component server 210 accesses resource data and determines a myriad of normalized data and resource values (e.g., as discussed herein with respect to FIGS. 4A, 4B, and 5-7) to generate and output the normalizing resource estimate aggregation interface component 301 for rendering to the project management user interface 300. Such examples, however, are for purposes of illustration and not of limitation and other suitable variations of facilitating the generation and output of a normalizing resource estimate aggregation interface component 301 are also contemplated by this disclosure as will be apparent to one of ordinary skill in the art.

In some embodiments, the normalizing resource estimate aggregation interface component request comprises a selected portfolio identifier associated with the selected portfolio. In a non-limiting example, the user identifies the selected portfolio via a drop-down menu (not depicted) in association with generating the normalizing resource estimate aggregation interface component request. In some embodiments, the selected portfolio identifier is associated with one or more principal development unit objects.

Additionally or alternatively, in some embodiments, the normalizing resource estimate aggregation interface component request comprises a unique user identifier associated with the requesting user. For example, a client device 101A-101N may receive or access the user identifier. To provide further context, the user identifier may be received remotely, via wireless communication or tethered communication, or directly, via input into one of the client devices 101A-101N. In some embodiments, the user may have a remote device, such as a mobile device or key fob that interacts with the client devices 101A-101N to transmit an user identifier and/or other related user data to authenticate the user. In another example, a user may simply provide login credentials through the interface of their client device 101A-101N. The client device 101A-101N then provides and/or transmits the unique user identifier to the apparatus (e.g., normalizing resource estimate aggregation interface component server 210, etc.) as part of or in addition to the normalizing resource estimate aggregation interface component request. Additionally or alternatively, the normalizing resource estimate aggregation interface component request comprises any one or more data points or identifiers necessary to cull relevant information in order to generate the normalizing resource estimate aggregation interface component. Non-limiting examples include project identifier, team identifier, team member identifier, sprint identifier, development unit type, and/or the like.

In some embodiments, with respect to a normalizing resource estimate aggregation interface component request, the apparatus (e.g., a normalizing resource estimate aggregation interface component server 210) accesses resource data associated with each of the one or more principal development unit objects associated with selected portfolio identifier. For example, the normalizing resource estimate aggregation interface component server 210 queries a repository, such as resource data repository 215, based on the selected portfolio identifier, for resource data associated with each of the one or more principal development unit objects. Resource data may contain a variety of data associated with future, current, historical, completed, and/or past development units. For example, in some embodiments, resource data comprises such data points as user identifier(s), development unit identifier(s), planning increment identifier(s), portfolio identifier(s), team identifier(s), resource value identifier(s), development unit status identifier(s), primary program identifier(s), non-normalized accepted estimation unit value(s), universal estimation system conversion variable(s), normalized program resource per estimation unit (e.g., baselined), planning increment predicted resource value(s), planning increment estimation unit prediction(s), functionality resource estimation value(s), functionality estimation unit prediction(s), normalized program resource per estimation unit(s) (e.g., baselined), and/or the like.

In some embodiments, the apparatus (e.g., a normalizing resource estimate aggregation interface component server 210) determines a current normalized program resource per estimation unit based at least in part on the resource data for each program development unit. For example, in some embodiments, the accessed resource data comprises a myriad of data such as team identifier(s), sprint identifier(s), development unit identifier(s), non-normalized accepted estimation unit value(s), and the like and each of the one or more program development units comprises and/or is associated with one or more active team units. In still further embodiments, each active team is associated with a plurality of subsidiary development units (e.g., child development units of the program development units, such as story development units or sprint development units) and the apparatus identifies a set of subsidiary development units from the plurality of subsidiary development units associated with the active team units.

In still certain embodiments, each active team unit assigns non-normalized accepted estimation unit values to estimate the level of work associated with such subsidiary development units, each active team being associated with a differing relative estimation unit valuation scale. In a non-limiting contextual example in a software development project utilizing agile project management, the non-normalized estimation unit value (i.e., the estimated effort to be expended) for 5 story points for a task by Team A in a sprint is not necessarily the same non-normalized estimation unit value (i.e., effort expended) for 5 story points for a task by Team B in a sprint. Moreover, the estimation unit (e.g., corresponding to the estimated level of work) associated with the determination is not limited to story points. To provide further context, in the above examples, the estimation unit of the non-normalized estimation unit values is story points, however, the estimation unit associated with a development unit can otherwise be determined or assigned by the team unit. For example, team units may choose to use story points, units of time, hours worked, T-shirt size (etc., XS, S, M, L, XL), member weeks, team weeks, issue count, and/or any other customized unit to estimate an non-normalized estimation unit value associated with a development unit (e.g., task, issue, story, bug, sprint, and/or the like).

In some embodiments, the apparatus identifies a non-normalized accepted estimation unit value for each active team unit based on the relative estimation unit valuation scale associated with the corresponding active team unit for each subsidiary development unit of the set of subsidiary development units. For example, in some embodiments, the apparatus generates, for each subsidiary development unit of the set of subsidiary development units, a normalized accepted estimation unit value based on a normalization of the non-normalized accepted estimation unit value to a common estimation unit valuation scale. In some embodiments, such normalization is based on a universal estimation system conversion variable. Such universal estimation system conversion variable can be determined in a myriad of ways. For example, in some embodiments, users can define the universal estimation system conversion variable via user interaction with the project management system 200. Additionally or alternatively, in some embodiments, the apparatus provides for use of a machine learning model designed to leverage artificial intelligence in connection with the determination of a universal estimation system conversion variable. In determining the universal estimation system conversion variable, the apparatus may draw from a range of information sources that can be supplied to the machine learning model in order to make suggestions or predictions as to a realistic universal estimation system conversion variable. For example, any one or more of the data described herein (e.g., resource data, historical resource data, and/or the like) and correlations thereof can be used in connection with the machine learning model. For example, in some embodiments, although the varied data inputted and outputted in an agile project management environment is not necessarily comparable nor are the key performance indicators necessarily selectable by a human, the dissimilar aggregate data structure formed from such complex data corpus can be analyzed by the machine learning model to programmatically determine at least the universal estimation system conversion variable. Moreover, in some embodiments, the machine learning based model employed by the apparatus can be trained using such historical resource data, resource data, and/or the like. For example, in some embodiments, the apparatus (e.g., via normalizing resource estimate aggregation interface circuitry 205) implements an unsupervised learning structure, a supervised learning structure, a reinforcement learning structure, a deep learning structure, and/or the like for programmatically determining correlations of the varied data and data formats to make suggestions or predictions as to at least the universal estimation system conversion variable.

In some embodiments, the apparatus, based on the normalized accepted estimation unit values, determines a normalized team resource per estimation unit for each active team unit for each subsidiary development unit of the set of subsidiary development units and generates an averaged incremental normalized program resource per estimation unit by averaging the normalized team resource per estimation unit values associated with the active team units. In still certain embodiments, the apparatus calculates the current normalized program resource per estimation unit by averaging an aggregation of the averaged incremental normalized program resource per estimation units associated with the set of subsidiary development units.

In still certain embodiments, the apparatus determines a predicted resource value, an expected resource value, and an accepted resource value for each principal development unit object as discussed herein in detail with respect to FIGS. 4A, 4B, and 5-7.

In some embodiments, the apparatus (e.g., a normalizing resource estimate aggregation interface component server 210) generates the normalizing resource estimate aggregation interface component 301, wherein the normalizing resource estimate aggregation interface component 301 comprises a summary presentation 305 of at least one of the principal development unit objects, and wherein each summary presentation 305 comprises the predicted resource value 302, the expected resource value 303, and the accepted resource value 304 for the corresponding principal development unit object, as depicted in FIG. 3A.

In still further embodiments, the apparatus (e.g., a normalizing resource estimate aggregation interface component server 210) further detects a display detailed normalizing resource estimate interface component request associated with a resource value identifier corresponding to one of the predicted resource value 302, the expected resource value 303, and the accepted resource value 304 and generates and outputs a detailed normalizing resource estimate aggregation interface component 350 based on the associated resource value identifier for rendering to the project management user interface 300 associated with the user identifier. For example, as depicted in FIG. 3C, after detecting a display detailed normalizing resource estimate interface component request associated with an expected resource value identifier corresponding to user interaction (e.g., mouse click, selection, hover action, or the like) with the expected resource value 303 of the normalizing resource estimate aggregation interface component 301 in FIGS. 3A and 3B, the apparatus (e.g., a normalizing resource estimate aggregation interface component server 210) further generates and outputs a detailed normalizing resource estimate aggregation interface component 350.

In some embodiments, the detailed normalizing resource estimate aggregation interface component 350 optionally comprises a summary description and/or definition of the expected resource value 303 and displays a breakdown of the total counts of development units associated with the corresponding resource value calculation. For example, in the detailed normalizing resource estimate aggregation interface component 350 corresponding to the expected resource value identifier as depicted in FIG. 3B, the displayed development unit breakdown relates to "Features" (e.g., functionality development unit) which relates to the determination of the expected resource value 303 determination as discussed with respect to FIG. 6 herein. For example, as depicted, there are 48 total functionality development units (e.g., total count of child features) associated with the selected principal development unit (e.g., epic development unit), 38 of which have been assigned functionality estimation unit predictions by team units such that such 38 functionality development units are included in the determination of the corresponding expected resource value 303, and 10 of which have not been assigned functionality estimation unit predictions such that the 10 functionality development units are not included in the determination of the corresponding expected resource value 303.

In certain embodiments, the detailed normalizing resource estimate aggregation interface component 350 optionally comprises a representation of the expected resource value 303 associated with the selected principal development unit (e.g., epic development unit). In still further embodiments, the apparatus (e.g., a normalizing resource estimate aggregation interface component server 210) is configured to determine a visual emphasis element for such depiction of the resource value (e.g., the expected resource value 303) in the detailed normalizing resource estimate aggregation interface component 350. For example, the visual emphasis element may be a contextually relevant coloring scheme (e.g., red) to depict a discrepancy (e.g., over budget) in the selected resource value (e.g., the expected resource value 303). In a further example, the visual emphasis element may be a contextually relevant coloring scheme (e.g., green) to depict the sufficiency (e.g., under budget) of the selected resource value (e.g., the expected resource value 303).

In certain embodiments, the detailed normalizing resource estimate interface component 350 comprises a listing of the one or more development units associated with the selected resource identifier. For example, the example detailed normalizing resource estimate aggregation interface component 350 corresponding to the expected resource value identifier in FIG. 3B includes a listing of the functionality development units (e.g., features) that are included in the determination of the corresponding expected resource value 303.

Although not depicted, in some embodiments, the apparatus (e.g., a normalizing resource estimate aggregation interface component server 210) similarly generates and outputs detailed normalizing resource estimate aggregation interface component(s) 350 based on the associated resource value identifier for rendering to the project management user interface 300 in instances wherein the user interacts (e.g., mouse click, selection, hover action, or the like) with the predicted resource value 302 or the accepted resource value 304, wherein the information displayed similarly corresponds to the underlying development units, data, and calculations for determining such resource value.

Example Operations Performed

Having described the apparatus, system, and exemplary circuitry comprising embodiments of the present disclosure, it should be understood that the apparatus may proceed to output a normalizing resource estimate aggregation interface component in a project management system in a number of ways. FIG. 4A is a flowchart broadly illustrating a series of operations or process blocks that are executed or performed to output a normalizing resource estimate aggregation interface component in accordance with some example embodiments of the present disclosure. The operations illustrated in FIG. 4A may, for example, be performed by, with the assistance of, and/or under the control of an apparatus (e.g., normalizing resource estimate aggregation interface component server 210), as described above. In this regard, performance of the operations may invoke one or more of memory 201, processor 202, input/output circuitry 203, communications circuitry 204, and/or normalizing resource estimate aggregation interface circuitry 205.

In the embodiment illustrated in FIG. 4A, the flowchart illustrates method 400 which includes detecting a normalizing resource estimate aggregation interface component request at Block 402. For example, the normalizing resource estimate aggregation interface component server 210 may include means, such as the processor 202, communications circuitry 204, normalizing resource estimate aggregation interface circuitry 205, or the like, for detecting a normalizing resource estimate aggregation interface component request. In some embodiments, the normalizing resource estimate aggregation interface component request is detected in response to user interaction with a project management user interface. In still further embodiments, the normalizing resource estimate aggregation interface component request is associated with a selected portfolio identifier and/or a user identifier.

As shown in Block 404, in some embodiments, the normalizing resource estimate aggregation interface component server 210 includes means, such as the processor 202, input/output circuitry 203, communications circuitry 204, normalizing resource estimate aggregation interface circuitry 205, or the like, to access resource data. For example, in some embodiments, the normalizing resource estimate aggregation interface component server 210 queries a repository for resource data using a portfolio identifier, wherein the selected portfolio identifier is associated with one or more principal development unit objects. For example, using a portfolio identifier associated with the normalizing resource estimate aggregation interface component request detected at Block 402, the normalizing resource estimate aggregation interface component server 210 queries a repository, such as resource data repository 215, to access resource data associated one or more principal development unit objects corresponding to the selected portfolio identifier.

At Block 406, the method 400 further includes, based on the accessed resource data, determining a current normalized program resource per estimation unit for each program development unit associated with the principal development unit object. For example, the normalizing resource estimate aggregation interface component server 210 may include means, such as the processor 202, communications circuitry 204, normalizing resource estimate aggregation interface circuitry 205, or the like, for determining a current normalized program resource per estimation unit. The current normalized program resource per estimation unit for a program development unit can be calculated in a number of ways. In a non-limiting contextual example, the resource data accessed at Block 404 comprises resource data for a myriad of program development units associated with a selected principal development unit, Epic Alpha. A first program development unit, Program X, is associated with two active team units, Teams A and B. In this example, the accessed resource data comprises data associated with a plurality of sprint development units associated with Teams A and B, including underlying non-normalized team resource per estimation units associated with Teams A and B. The normalizing resource estimate aggregation interface component server 210, utilizing, for example, normalizing resource estimate aggregation interface circuitry 205, normalizes such non-normalized team resource per estimation units using a global conversion variable associated with the organization. In this non-limiting contextual example, the normalized team resource per estimation unit associated with Team A's most recent sprint development unit is $300 per story point and the normalized team resource per estimation unit associated with Team B's most recent sprint development unit is $500 per story point, and these normalized team resource per estimation units are averaged together to generate an incremental normalized program resource per estimation unit associated with the most recent sprint development unit of $400 per story point. Further to this non-limiting example, the averaged incremental normalized program resource per estimation unit is determined for the next 4 most recent sprint development units for each of Team A and Team B. In this non-limiting contextual example, the normalized program resource per estimation unit for Program X is generated as a rolling average of the aggregation of such 5 incremental normalized program resource per estimation units.

In still further embodiments, the apparatus provides for use of a machine learning model designed to leverage artificial intelligence in connection with the determination of a current normalized program resource per estimation unit for each program development unit associated with the principal development unit object. In determining the current normalized program resource per estimation unit, the apparatus may draw from a range of information sources that can be supplied to the machine learning model in order to make suggestions or predictions as to a realistic current normalized program resource per estimation unit for each program development unit. For example, any one or more of the data described herein (e.g., resource data, historical resource data, and/or the like) and correlations thereof can be used in connection with the machine learning model. For example, in some embodiments, although the varied data inputted and outputted in an agile project management environment is not necessarily comparable nor are the key performance indicators necessarily selectable by a human, the dissimilar aggregate data structure formed from such complex data corpus can be analyzed by the machine learning model to programmatically determine at least the current normalized program resource per estimation unit for each program development unit. Moreover, in some embodiments, the machine learning based model employed by the apparatus can be trained using such historical resource data, resource data, and/or the like. For example, in some embodiments, the apparatus (e.g., via normalizing resource estimate aggregation interface circuitry 205) implements an unsupervised learning structure, a supervised learning structure, a reinforcement learning structure, a deep learning structure, and/or the like for programmatically determining correlations of the varied data and data formats to make suggestions or predictions as to at least the current normalized program resource per estimation unit for each program development unit.

At Block 408, the method 400 further includes determining a predicted resource value, an expected resource value, and an accepted resource value for each principal development unit object. For example, the normalizing resource estimate aggregation interface component server 210 may include means, such as the processor 202, communications circuitry 204, normalizing resource estimate aggregation interface circuitry 205, or the like, for determining predicted resource value(s), expected resource value(s), and accepted resource value(s). The processes for determining predicted resource value(s), expected resource value(s), and accepted resource value(s) are described in greater detail below with respect to FIGS. 4A, 4B, and 5-7.

As illustrated at Blocks 410 and 412, in some embodiments, the normalizing resource estimate aggregation interface component server 210 further include means, such as the processor 202, input/output circuitry 203, communications circuitry 204, normalizing resource estimate aggregation interface circuitry 205, or the like, to generate a normalizing resource estimate aggregation interface component comprising a summary presentation of at least one of the principal development unit objects and output the normalizing resource estimate aggregation interface component for rendering to the project management user interface. In some embodiments, each summary presentation comprises the predicted resource value, the expected resource value, and the accepted resource value determined at Block 408 for each of the corresponding principal development unit objects.

As illustrated at Block 414, in some embodiments, the normalizing resource estimate aggregation interface component server 210 further include means, such as the processor 202, input/output circuitry 203, communications circuitry 204, normalizing resource estimate aggregation interface circuitry 205, or the like, to optionally detect a display detailed normalizing resource estimate interface component request. For example, in certain embodiments, user interaction with the normalizing resource estimate aggregation interface component 301 results in an apparatus (e.g., client device 101A) generating a display detailed normalizing resource estimate interface component request. In certain embodiments, the display expanded resource estimate interface component request is associated with a resource value identifier corresponding to one of the predicted resource value, the expected resource value, and the accepted resource value based on the user interaction with the normalizing resource estimate aggregation interface component 301.

As illustrated at Blocks 416 and 418, in some embodiments, in response to detecting the display detailed normalizing resource estimate interface component request, the normalizing resource estimate aggregation interface component server 210 further include means, such as the processor 202, input/output circuitry 203, communications circuitry 204, normalizing resource estimate aggregation interface circuitry 205, or the like, to optionally generate and output a detailed normalizing resource estimate aggregation interface component 350 based on the associated resource value identifier for rendering to the project management user interface 300 associated with the user identifier. In certain embodiments, the detailed resource estimate interface component comprises a listing of the one or more development units associated with the selected resource identifier, such as depicted in FIGS. 3B-3D.

FIG. 4B is a signal diagram of an example data flow represented by method 400. That is, FIG. 4B illustrates an example signal diagram illustrating data flow interactions between a normalizing resource estimate aggregation interface component server, a repository, and a client device when outputting a normalizing resource estimate aggregation interface component in accordance with one embodiment. Method 400 is described as being performed by a client device 101A, a normalizing resource estimate aggregation interface component server 210, and resource data repository 215. These may be similar to those previously discussed with regards to FIG. 1.

Turning now to FIG. 5, example operations are shown for determining a predicted resource value for a principal development unit object. As with FIG. 4A, the operations illustrated in FIG. 5 may, for example, be performed by the normalizing resource estimate aggregation interface component server 210, which may include means, such as the processor 202, input/output circuitry 203, communications circuitry 204, normalizing resource estimate aggregation interface circuitry 205, or the like, for determining a predicted resource value for a selected principal development unit object, wherein the selected program development unit comprises one or more planning increments.

As illustrated at Block 502, in some embodiments, method 500 includes determining whether any of the planning increments of the selected program development unit are completed. For example, the normalizing resource estimate aggregation interface component server 210 may include means, such as the processor 202, communications circuitry 204, normalizing resource estimate aggregation interface circuitry 205, or the like, for determining whether any development unit status identifiers associate with any of the planning increments of the selected program development unit are identified as completed. The inventors have determined it would be advantageous to preserve the assumptions, calculations, and data associated with development units (e.g., planning increments), at the time they are completed in order to prevent or mitigate impact on calculations due to changes in underlying resources. For example, parameters associated with a team unit may change or differ over time or even sprint to sprint, such as team member composition or team velocity, thereby affecting, for example, cost calculations when financial impact is the underlying resource basis for the calculations. Accordingly, in some embodiments, when a development unit, such as a planning increment is deemed completed (e.g., expiration of planning increment such as end of quarter), the normalizing resource estimate aggregation interface component server 210 stores and/or baselines the current planning increment predicted resource value coinciding with the completed planning increment development unit as a baselined planning increment predicted resource value.

Subsequently, at Block 504, in response to determining that one or more planning increments associated with the selected program development unit are completed, method 500 includes accessing a baselined planning increment predicted resource value for each completed planning increment. For example, the normalizing resource estimate aggregation interface component server 210 includes means, such as the processor 202, input/output circuitry 203, communications circuitry 204, normalizing resource estimate aggregation interface circuitry 205, or the like, to access such baselined planning increment predicted resource values for each planning increment determined to be completed at Block 502. Block 504 can be performed prior to, concurrently, or subsequent to Block 506.

In some embodiments, the baselined planning increment predicted resource value of a planning increment that is completed is optionally based on a baselined planning increment estimation unit prediction and a baselined current normalized program resource per estimation unit associated with the completed planning increment development unit. In a non-limiting contextual example, the first planning increment associated with Program A is determined to be completed at Block 502 and the normalizing resource estimate aggregation interface component server 210 accesses the baselined planning increment predicted resource value associated with the first planning increment associated with Program A at Block 504. In this non-limiting contextual example, the baselined normalized program resource per estimation unit is $10 per story point for Program A and the baselined planning increment estimation unit prediction for the first planning increment of Program A is 15 story points, resulting in a baselined planning increment predicted resource value of $150 for the first planning increment associated with Program A.

At Block 506, method 500 includes determining a current planning increment predicted resource value for each planning increment that is not completed. For example, the normalizing resource estimate aggregation interface component server 210 includes means, such as the processor 202, input/output circuitry 203, communications circuitry 204, normalizing resource estimate aggregation interface circuitry 205, or the like, to determine a current planning increment predicted resource value for each planning increment that was not determined to be completed at Block 502. Block 506 can be performed prior to, concurrently, or subsequent to Block 504.

In some embodiments, the current planning increment predicted resource value of a planning increment that is not completed is optionally based on a current planning increment estimation unit prediction and the current normalized program resource per estimation unit. In a non-limiting contextual example, the resource data accessed at Block 404 comprises current planning increment estimation unit predictions for planning increments associated with Programs A and B. In this non-limiting contextual example, the current planning increment estimation unit prediction for the second planning increment of Program A is 18 story points and Program B only has one planning increment with a planning increment estimation unit prediction of 12 story points. In this non-limiting contextual example, the current normalized program resource per estimation unit determined at Block 406 of method 400 is $10 per story point for Program A and $12 per story point for Program B. Accordingly, the current planning increment predicted resource value of the second planning increment of Program A is $180 (e.g., 18 story points at $10 per story point) and the current planning increment predicted resource value of the planning increment of Program B is $144 (12 story points at $12 per story point).

At Block 508, in some embodiments, the normalizing resource estimate aggregation interface component server 210 includes means, such as the processor 202, input/output circuitry 203, communications circuitry 204, normalizing resource estimate aggregation interface circuitry 205, or the like, to aggregate the baselined and current planning increment predicted resource values. For example, continuing in the above-identified non-limiting contextual example, the predicted resource value is $474, which is the aggregation of the baselined planning increment predicted resource value of the first planning increment of Program A (e.g., $150), the current planning increment predicted resource value of the second planning increment of Program A (e.g., $180), and the current planning increment predicted resource value of the planning increment of Program B (e.g., $144), thereby providing an indication to the user of how work effort compares against a predicted budget early on in the lifecycle of an epic.

Turning now to FIG. 6, example operations are shown for determining an expected resource value for a principal development unit object. The operations illustrated in FIG. 6 may, for example, be performed by the normalizing resource estimate aggregation interface component server 210, which may include means, such as the processor 202, input/output circuitry 203, communications circuitry 204, normalizing resource estimate aggregation interface circuitry 205, or the like, for determining an expected resource value for a selected principal development unit object (e.g., Epic Alpha). In some embodiments, the selected program development unit optionally comprises one or more functionality development units. In some further embodiments, a selected functionality development unit is associated with two or more program development units. In certain embodiments, the selected functionality development unit is assigned a primary program development unit and the associated functionality resource estimation value is based on resource data associated with the primary program development unit. For example, in some embodiments, the selected functionality development unit is assigned a primary program development unit upon creation of the feature (e.g., the creating user associates the selected functionality development unit with a selected primary program development unit thereby indicating which program development unit is going to be responsible for the delivery of such functionality development unit) and the associated functionality resource estimation value is based on resource data associated with the primary program development unit. Additionally or alternatively, in some embodiments, a primary program development unit is not assigned or associated with the functionality development unit and the normalizing resource estimate aggregation interface component server 210 determines a relative contribution associated with each program development unit to the selected functionality development unit and the associated functionality resource estimation values are based on resource data associated with each program development unit according to such relative contributions.

As illustrated at Block 602, in some embodiments, method 600 includes determining whether any of the functionality development units of the selected program development unit are associated with an accepted status. For example, the normalizing resource estimate aggregation interface component server 210 may include means, such as the processor 202, communications circuitry 204, normalizing resource estimate aggregation interface circuitry 205, or the like, for determining whether any development unit status identifiers associated with any of the functionality development units of the selected program development unit are identified as accepted.

Subsequently, at Block 604, in response to determining that one or more functionality development units associated with the selected program development unit are associated with an accepted status, method 600 includes accessing a baselined functionality resource estimation value for each accepted functionality resource estimation value. For example, the normalizing resource estimate aggregation interface component server 210 includes means, such as the processor 202, input/output circuitry 203, communications circuitry 204, normalizing resource estimate aggregation interface circuitry 205, or the like, to access such functionality resource estimation values for each functionality development unit deemed accepted at Block 602. Block 604 can be performed prior to, concurrently, or subsequent to Block 606.

In some embodiments, the baselined functionality resource estimation value of an accepted functionality development unit is optionally based on a baselined functionality estimation unit prediction and a baselined normalized program resource per estimation unit for the program development unit comprising the accepted functionality development unit. In a non-limiting contextual example, a functionality development unit associated with Program A is determined to be accepted at Block 602 and the normalizing resource estimate aggregation interface component server 210 accesses the baselined functionality resource estimation value associated with the functionality development unit associated with Program A at Block 604. In this non-limiting contextual example, the baselined normalized program resource per estimation unit is $10 per story point for Program A and the baselined functionality estimation unit prediction for the functionality development unit of Program A is 10 story points, resulting in a baselined functionality resource estimation value of $100 for the functionality development unit associated with Program A.

At Block 606, method 600 includes determining a current functionality resource estimation value for each functionality development unit associated with the selected principal development object that is not associated with an accepted status. For example, the normalizing resource estimate aggregation interface component server 210 includes means, such as the processor 202, input/output circuitry 203, communications circuitry 204, normalizing resource estimate aggregation interface circuitry 205, or the like, to determine a current functionality resource estimation value for each functionality development unit that was not determined to be accepted at Block 602. Block 606 can be performed prior to, concurrently, or subsequent to Block 604. In some embodiments, the current functionality resource estimation value of an accepted functionality development unit is optionally based on a current functionality estimation unit prediction and the current normalized program resource per estimation unit for the program development unit comprising the corresponding functionality development unit.

Further to the non-limiting contextual example described with respect to Block 604, the current functionality estimation unit prediction is 5 story points for a functionality development unit associated with Program B and 8 story points for a functionality development unit associated with Program C. In this non-limiting contextual example, the current normalized program resource per estimation unit determined at Block 406 of method 400 is $12 per story point for Program B and $9 per story point for Program C. Accordingly, the current functionality resource estimation value of the functionality development unit of Program B is $60 (e.g., 5 story points at $12 per story point) and the current functionality resource estimation value of the functionality development unit of Program C is $72 (8 story points at $9 per story point).

At Block 608, in some embodiments, the normalizing resource estimate aggregation interface component server 210 includes means, such as the processor 202, input/output circuitry 203, communications circuitry 204, normalizing resource estimate aggregation interface circuitry 205, or the like, to aggregate the baselined and current functionality resource estimation values of the selected principal development unit object. For example, continuing in the above-identified non-limiting contextual example, the expected resource value is $232, which is the aggregation of the baselined functionality resource estimation value of the functionality development unit of Program A (e.g., $100), the current functionality resource estimation value of the functionality development unit of Program B (e.g., $60), and the current functionality resource estimation value of the functionality development unit of Program C (e.g., $72), thereby providing an indication to the user of how work effort compares against a predicted budget, somewhat later as compared to the predicted resource value, but still early on in the lifecycle.

Turning now to FIG. 7, example operations are shown for determining an accepted resource value for a principal development unit object. The operations illustrated in FIG. 7 may, for example, be performed by the normalizing resource estimate aggregation interface component server 210, which may include means, such as the processor 202, input/output circuitry 203, communications circuitry 204, normalizing resource estimate aggregation interface circuitry 205, or the like, for determining an accepted resource value for a selected principal development unit object. In some embodiments, the selected program development unit optionally comprises one or more story development units.

As illustrated at Block 702, in some embodiments, method 700 includes identifying one or more story development units of the selected principal development unit object associated with an accepted status. For example, the normalizing resource estimate aggregation interface component server 210 may include means, such as the processor 202, communications circuitry 204, normalizing resource estimate aggregation interface circuitry 205, or the like, for determining whether any development unit status identifiers associated with any of the one or more story development units of the selected program development unit are identified as accepted. In a non-limiting contextual example, the normalizing resource estimate aggregation interface component server 210 identifies two accepted stories, Accepted Story A and Accepted Story B associated with the selected principal development object (e.g., Epic Alpha).

Subsequently, at Block 704, in response to identifying one or more accepted story development units of the selected principal development unit object, the normalizing resource estimate aggregation interface component server 210 includes means, such as the processor 202, input/output circuitry 203, communications circuitry 204, normalizing resource estimate aggregation interface circuitry 205, or the like for determining an accepted story resource value.

An accepted story resource value can be determined in a myriad of ways. For example, in some embodiments, the normalizing resource estimate aggregation interface component server 210 optionally identifies a sprint identifier for each accepted story development unit, determines a current work effort value associated with each story development unit, determines a current normalized team resource per estimation unit for each accepted story development unit based at least in part on the resource data associated with each respective sprint identifier, and generates the accepted story resource value for each accepted story development unit based on the associated current work effort value and current normalized team resource per estimation unit. In the non-limiting contextual example discussed with respect to Block 702, the normalizing resource estimate aggregation interface component server 210 identifies Accepted Story A as assigned to Sprint 1 by Team F and identifies Accepted Story B as assigned to Sprint 2 by Team G. The normalizing resource estimate aggregation interface component server 210 optionally further determines a current work effort value of LOE 5 for Accepted Story A and LOE 2 for Accepted Story B. The normalizing resource estimate aggregation interface component server 210 optionally further determines a current normalized team resource per estimation unit of $5 per story point for Accepted Story A and a current normalized team resource per estimation unit of $4 per story point for Accepted Story B, based at least in part on the resource data (e.g., the underlying team resource per development unit associated with Team F in Sprint 1 is $50 and Team F delivered 10 accepted story points in Sprint 1=the team resource per estimation unit is $5 per story point for Team A with respect to Sprint 1) associated with Sprint 1 and Sprint 2, respectively. Accordingly, the accepted story resource value of Accepted Story A is $25 (e.g., LOE 5 at $5 per story point) and the accepted story resource value of Accepted Story B is $8 (e.g., LOE 2 at $4 per story point).

Subsequently at Block 706, in some embodiments, the normalizing resource estimate aggregation interface component server 210 includes means, such as the processor 202, input/output circuitry 203, communications circuitry 204, normalizing resource estimate aggregation interface circuitry 205, or the like, to aggregate the accepted story resource values of the selected principal development unit object (e.g., Epic Alpha). For example, continuing in the above-identified non-limiting contextual example, the accepted resource value is $33, which is the aggregation of the accepted story resource values of Accepted Story 1 (e.g., $25) and Accepted Story 2 (e.g., $8), thereby providing insight into understanding any variance between what was budgeted, predicted, expected, and ultimately accepted once teams associated with the principal development unit (e.g., Epic Alpha) have started actually providing deliverables associated with the principal development unit.

Turning now to FIG. 8, example operations are shown for generating and outputting a snapshot resource allocation interface component. The operations illustrated in FIG. 8 may, for example, be performed by the normalizing resource estimate aggregation interface component server 210, which may include means, such as the processor 202, input/output circuitry 203, communications circuitry 204, normalizing resource estimate aggregation interface circuitry 205, or the like, for generating and outputting a snapshot resource allocation interface component.

As illustrated at Block 802, in some embodiments, method 700 includes detecting a snapshot resource allocation interface component request. For example, the normalizing resource estimate aggregation interface component server 210 may include means, such as the processor 202, communications circuitry 204, normalizing resource estimate aggregation interface circuitry 205, or the like, for detecting a snapshot resource allocation interface component request. In certain embodiments, the snapshot resource allocation interface component request is associated with the selected portfolio identifier detected at Block 402.

Subsequently, at Block 804, in response to includes detecting a snapshot resource allocation interface component request, the normalizing resource estimate aggregation interface component server 210 includes means, such as the processor 202, input/output circuitry 203, communications circuitry 204, normalizing resource estimate aggregation interface circuitry 205, or the like for generating a snapshot resource allocation interface component 340, such as depicted in FIG. 3A.

In some embodiments, the snapshot resource allocation interface component 340 optionally comprises an alphanumeric depiction of the resources designated or associated with the organization associated with the selected portfolio. For example, the snapshot resource allocation interface component 340 depicted in FIG. 3A for Acme Core Development indicates that $2,900,000 has been allocated to the selected portfolio.

In some embodiments, the snapshot resource allocation interface component 340 optionally comprises a summary presentation of allocated resources associated with the selected portfolio. In still certain embodiments, the summary presentation depicts such allocated or otherwise consumed resources in comparison to the total resources designated, allocated, or otherwise budgeted to the selected portfolio. For example, in some embodiments, one or more of the designated resources are shared resources (e.g., not assigned to the selected team or project) such that the normalizing resource estimate aggregation interface component server 210 accounts for relative contribution and allocations. In still further embodiments, the normalizing resource estimate aggregation interface component server 210 determines such shared resources based on analysis of resource data associated with the selected portfolio, including contributing user identifiers (e.g., even when user identifiers may not be assigned to a relevant team). In certain embodiments, the snapshot resource allocation interface component 340 comprises one or more visual emphasis elements comprising one or more visual consumption depictions visually depicting such consumption. For example, as depicted in FIG. 3A, a circle scale displays the percentage of the total resources designated or associated with the organization associated with the selected portfolio that are consumed by the aggregated planning increment allocated resources. In still further embodiments, the visual emphasis element may be a contextually relevant coloring scheme (e.g., red) to depict a discrepancy (e.g., over budget) in the corresponding aggregation. In a further example, the visual emphasis element may be a contextually relevant coloring scheme (e.g., green) to depict the sufficiency (e.g., under budget) of the corresponding aggregation.

In some embodiments, the snapshot resource allocation interface component 340 optionally comprises a listing of one or more development units associated with the selected portfolio identifier. In still further embodiments, the normalizing resource estimate aggregation interface component server 210 optionally determines, and the snapshot resource allocation interface component 340 optionally comprises, one or more visual emphasis elements providing a visual depiction of the consumption (e.g., whether on-budget, over-budget, or the like) of each development unit.

Subsequently at Block 806, in some embodiments, the normalizing resource estimate aggregation interface component server 210 includes means, such as the processor 202, input/output circuitry 203, communications circuitry 204, normalizing resource estimate aggregation interface circuitry 205, or the like, to output the snapshot resource allocation interface component 340 to the project management user interface 300.

FIGS. 4A, 4B and 5-8 thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the normalizing resource estimate aggregation interface component server 210 and executed by a processor 202 of the normalizing resource estimate aggregation interface component server 210. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for outputting a normalizing resource estimate aggregation interface component in a project management system, the apparatus comprising at least one processor, and at least one non-transitory memory including program code, the at least one non-transitory memory and the program code configured to, with the at least one processor, cause the apparatus to:

detect a normalizing resource estimate aggregation interface component request in response to user interaction with a project management user interface, wherein the normalizing resource estimate aggregation interface component request is associated with a selected portfolio identifier and a user identifier, and wherein the selected portfolio identifier is associated with one or more principal development unit objects;

access resource data associated with each of the one or more principal development unit objects, wherein each principal development unit object comprises one or more program development units;

for each program development unit, determine, via the at least one processor, a current normalized program resource per estimation unit based at least in part on the resource data;

determine, via the at least one processor, a predicted resource value, an expected resource value, and an accepted resource value for each principal development unit object, generate a normalizing resource estimate aggregation interface component, wherein the normalizing resource estimate aggregation interface component comprises a summary presentation of at least one of the principal development unit objects, and wherein each summary presentation comprises the predicted resource value, the expected resource value, and the accepted resource value for the corresponding principal development unit object; and output the normalizing resource estimate aggregation interface component for rendering to the project management user interface associated with the user identifier.

2. The apparatus of claim 1, wherein each of the one or more program development units comprises one or more active team units, wherein each active team is associated with a plurality of subsidiary development units, and wherein each active team unit is associated with a differing relative estimation unit valuation scale.

3. The apparatus of claim 2, wherein determining the current normalized program resource per estimation unit comprises:

identifying a set of subsidiary development units from the plurality of subsidiary development units;

for each subsidiary development unit of the set of subsidiary development units, identifying a non-normalized accepted estimation unit value for each active team unit based on the relative estimation unit valuation scale associated with the corresponding active team unit;

for each subsidiary development unit of the set of subsidiary development units generating a normalized accepted estimation unit value based on a normalization of the non-normalized accepted estimation unit value to a common estimation unit valuation scale;

based on the normalized accepted estimation unit values, determining a normalized team resource per estimation unit for each active team unit for each subsidiary development unit of the set of subsidiary development units;

for each subsidiary development unit of the set of subsidiary development units, generating an averaged incremental normalized program resource per estimation unit by averaging the normalized team resource per estimation unit values associated with the active team units; and calculating the current normalized program resource per estimation unit by averaging an aggregation of the averaged incremental normalized program resource per estimation units associated with the set of subsidiary development units.

4. The apparatus of claim 3, wherein generating the normalized accepted estimation unit value based on the normalization of the non-normalized accepted estimation unit value to the common estimation unit valuation scale is based at least on a universal estimation system conversion variable.

5. The apparatus of claim 4, wherein the universal estimation system conversion variable is based on a machine learning model.

6. The apparatus of claim 5, wherein the machine learning model is trained using historical resource data.

7. The apparatus of claim 3, wherein the set of subsidiary development units is the most recent n subsidiary development units associated with the active team such that the current normalized program resource per estimation unit is a rolling average.

8. The apparatus of claim 1, wherein each of the one or more program development units comprises one or more planning increments and wherein determining the predicted resource value for a selected principal development unit object comprises:

determining whether any of the planning increments of the selected program development unit are completed;

for each completed planning increment, accessing a baselined planning increment predicted resource value;

for each planning increment that is not completed, determining a current planning increment predicted resource value; and aggregating the baselined and current planning increment predicted resource values.

9. The apparatus of claim 8, wherein the current planning increment predicted resource value of a planning increment that is not completed is based on a current planning increment estimation unit prediction and the current normalized program resource per estimation unit.

10. The apparatus of claim 8, wherein the baselined planning increment predicted resource value of a completed planning increment is based on a baselined planning increment estimation unit prediction and a baselined normalized program resource per estimation unit.

11. The apparatus of claim 10, wherein the baselined normalized program resource per estimation unit is the current normalized program resource per estimate unit coinciding with the completion of the corresponding planning increment and stored in association with the completed planning increment.

12. The apparatus of claim 10, wherein the baselined planning increment estimation unit prediction is the current planning increment estimation unit prediction coinciding with the completion of the corresponding planning increment and stored in association with the completed planning increment.

13. The apparatus of claim 1, wherein at least one of the program development units comprises one or more functionality development units.

14. The apparatus of claim 13, wherein determining the expected resource value for a selected principal development unit object comprises:

determining whether any of the functionality development units of the selected principal development unit are associated with an accepted status;

for each accepted functionality development unit, accessing a baselined functionality resource estimation value;

for each functionality development unit that is not associated with an accepted status, determining a current functionality resource estimation value; and aggregating the baselined and current functionality resource estimation values of the selected principal development unit object.

15. The apparatus of claim 14, wherein in an instance a selected functionality development unit is associated with two or more program development units, the selected functionality development unit is assigned a primary program development unit and the associated functionality resource estimation value is based on resource data associated with the primary program development unit.

16. The apparatus of claim 14, wherein the current functionality resource estimation value of a selected functionality development unit that is not associated with an accepted status is based on a current functionality estimation unit prediction and the current normalized program resource per estimation unit for the program development unit comprising the selected functionality development unit.

17. The apparatus of claim 14, wherein the baselined functionality resource estimation value of an accepted functionality development unit is based on a baselined functionality estimation unit prediction and a baselined normalized program resource per estimation unit for the program development unit comprising the accepted functionality development unit.

18. The apparatus of claim 17, wherein the baselined normalized program resource per estimation unit is the current normalized program resource per estimate unit coinciding with the acceptance of the accepted functionality development unit and stored in association with the accepted functionality development unit.

19. The apparatus of claim 17, wherein the baselined functionality estimation unit prediction is the current functionality estimation unit prediction coinciding with the acceptance of the accepted functionality development unit and stored in association with the accepted functionality development unit.

20. The apparatus of claim 1, wherein each principal development unit object comprises one or more story development units.

21. The apparatus of claim 20, wherein determining the accepted resource value for a selected principal development unit object comprises:
identifying one or more story development units of the selected principal development unit object associated with an accepted status;
for each of the one or more story development units of the selected principal development unit object associated with an accepted status, determining an accepted story resource value; and
aggregating the accepted story resource values of the selected principal development unit object.

22. The apparatus of claim 21, wherein determining the accepted story resource value of a story development unit associated with an accepted status comprises:
identifying a sprint identifier for each accepted story development unit;
determining a current normalized team resource per estimation unit for each accepted story development unit based at least in part on the resource data associated with each respective sprint identifier;
determining a current work effort value associated with the story development unit; and
generating the accepted story resource value for each accepted story development unit based on an analysis of the associated current work effort value and current normalized team resource per estimation unit.

23. A computer-implemented method comprising:
detecting a normalizing resource estimate aggregation interface component request in response to user interaction with a project management user interface, wherein the normalizing resource estimate aggregation interface component request is associated with a selected portfolio identifier and a user identifier, and wherein the selected portfolio identifier is associated with one or more principal development unit objects;
accessing resource data associated with each of the one or more principal development unit objects, wherein each principal development unit object comprises one or more program development units;
for each program development unit, determining a current normalized program resource per estimation unit based at least in part on the resource data;
determining a predicted resource value, an expected resource value, and an accepted resource value for each principal development unit object,
generating a normalizing resource estimate aggregation interface component, wherein the normalizing resource estimate aggregation interface component comprises a summary presentation of at least one of the principal development unit objects, and wherein each summary presentation comprises the predicted resource value, the expected resource value, and the accepted resource value for the corresponding principal development unit object; and
outputting the normalizing resource estimate aggregation interface component for rendering to the project management user interface associated with the user identifier.

24. The computer-implemented method of claim 23, wherein each of the one or more program development units comprises one or more active team units, wherein each active team is associated with a plurality of subsidiary development units, and wherein each active team unit is associated with a differing relative estimation unit valuation scale.

25. The computer-implemented method of claim 24, wherein determining the current normalized program resource per estimation unit comprises:
identifying a set of subsidiary development units from the plurality of subsidiary development units;
for each subsidiary development unit of the set of subsidiary development units, identifying a non-normalized accepted estimation unit value for each active team unit based on the relative estimation unit valuation scale associated with the corresponding active team unit;
for each subsidiary development unit of the set of subsidiary development units generating a normalized accepted estimation unit value based on a normalization of the non-normalized accepted estimation unit value to a common estimation unit valuation scale;
based on the normalized accepted estimation unit values, determining a normalized team resource per estimation unit for each active team unit for each subsidiary development unit of the set of subsidiary development units;

for each subsidiary development unit of the set of subsidiary development units, generating an averaged incremental normalized program resource per estimation unit by averaging the normalized team resource per estimation unit values associated with the active team units; and calculating the current normalized program resource per estimation unit by averaging an aggregation of the averaged incremental normalized program resource per estimation units associated with the set of subsidiary development units.

26. One or more non-transitory computer-readable media storing computer-executable instructions that, when executed by one or more processors, are configured to cause:

detecting a normalizing resource estimate aggregation interface component request in response to user interaction with a project management user interface, wherein the normalizing resource estimate aggregation interface component request is associated with a selected portfolio identifier and a user identifier, and wherein the selected portfolio identifier is associated with one or more principal development unit objects;

accessing resource data associated with each of the one or more principal development unit objects, wherein each principal development unit object comprises one or more program development units;

for each program development unit, determining a current normalized program resource per estimation unit based at least in part on the resource data;

determining a predicted resource value, an expected resource value, and an accepted resource value for each principal development unit object, generating a normalizing resource estimate aggregation interface component, wherein the normalizing resource estimate aggregation interface component comprises a summary presentation of at least one of the principal development unit objects, and wherein each summary presentation comprises the predicted resource value, the expected resource value, and the accepted resource value for the corresponding principal development unit object; and outputting the normalizing resource estimate aggregation interface component for rendering to the project management user interface associated with the user identifier.

\* \* \* \* \*